United States Patent
Kojima

(10) Patent No.: US 9,144,000 B2
(45) Date of Patent: Sep. 22, 2015

(54) CELL SPECIFYING METHOD, BASE STATION, AND MOBILE STATION

(71) Applicant: FUJITSU LIMITED, Kawasaki-shi, Kanagawa (JP)

(72) Inventor: Yuji Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 7 days.

(21) Appl. No.: 13/860,715

(22) Filed: Apr. 11, 2013

(65) Prior Publication Data

US 2013/0225178 A1     Aug. 29, 2013

Related U.S. Application Data

(63) Continuation of application No. PCT/JP2010/006466, filed on Nov. 2, 2010.

(51) Int. Cl.
*H04W 36/24* (2009.01)
*H04W 76/04* (2009.01)
*H04W 36/00* (2009.01)

(52) U.S. Cl.
CPC ........ *H04W 36/245* (2013.01); *H04W 36/0083* (2013.01); *H04W 76/046* (2013.01)

(58) Field of Classification Search
CPC .................. H04W 36/00; H04B 2201/70702; H04J 11/0069
USPC ............. 455/456.6, 436, 422.1; 370/332, 312
See application file for complete search history.

(56) References Cited

U.S. PATENT DOCUMENTS

| | | | |
|---|---|---|---|
| 2010/0178922 A1* | 7/2010 | Han et al. | 455/436 |
| 2010/0272050 A1 | 10/2010 | Lim et al. | |
| 2010/0311421 A1* | 12/2010 | Mach | 455/436 |
| 2010/0317349 A1* | 12/2010 | Serravalle | 455/440 |
| 2010/0329167 A1* | 12/2010 | Linden et al. | 370/312 |
| 2012/0039305 A1* | 2/2012 | Han et al. | 370/332 |

FOREIGN PATENT DOCUMENTS

| | | |
|---|---|---|
| CN | 101873620 A | 10/2010 |
| WO | 2010/121553 A1 | 10/2010 |

OTHER PUBLICATIONS

International search report issued for corresponding International Patent Application No. PCT/JP2010/006466, mailed Dec. 14, 2010.

(Continued)

*Primary Examiner* — Lester Kincaid
*Assistant Examiner* — Gary Lafontant
(74) *Attorney, Agent, or Firm* — Myers Wolin, LLC

(57) ABSTRACT

In a cellular mobile communication system that operates in a first state in which UE has not established a connection with eNB and in a second state in which the connection has been established with eNB, the UE transmits cell selection history to the eNB of a second cell when handover from a first cell to the second cell in accordance with second criteria for handover in the second state, the cell selection history containing a history of cell selection performed in accordance with first criteria for cell reselection in the first state. When the UE performs handover from the first cell to the second cell within a period after transition from the first state to the second state, the eNB of the second cell specifies the cell in which the first criteria and the second criteria are not aligned from among the first cell and the second cell.

10 Claims, 18 Drawing Sheets

WHEN NON-ALIGNED CELL IS CELL A

(56) References Cited

OTHER PUBLICATIONS

3GPP TR 36.902 V9.2.0; 3rd Generation Partnership Project; Technical Specification Group Radio Access Network; Evolved Universal Terrestrial Radio Access Network (E-UTRAN); "Self-configuring and self-optimizing network (SON) use cases and solutions (Release 9)"; Jun. 2010.

"LTE Release 9"; NTT DoCoMo, vol. 18, No. 1; Apr. 1, 2010.

Office Action issued for corresponding Chinese Patent Application No. 201080069903.5 dated Apr. 30, 2015 with an English translation.

Notice of Preliminary Rejection issued for corresponding Korean Patent Application No. 10-2013-7011171, mailed Oct. 28, 2014, with an English translation.

\* cited by examiner

FIG. 8A

[CELL SELECTION HISTORY:PATTERN A]

| NO. | CELL | SERVING TIME | STATE |
|---|---|---|---|
| 1 | CELL A | LONG | IDLE |
| 2 | CELL A | SHORT | ACTIVE |
| 3 | CELL B | — | ACTIVE |

WHEN CELL A IS NOT ALIGNED

FIG. 8B

[CELL SELECTION HISTORY:PATTERN B]

| NO. | CELL | SERVING TIME | STATE |
|---|---|---|---|
| 1 | CELL B | LONG | IDLE |
| 2 | CELL A | SHORT | IDLE |
| 3 | CELL A | SHORT | ACTIVE |
| 4 | CELL B | — | ACTIVE |

WHEN CELL B IS NOT ALIGNED

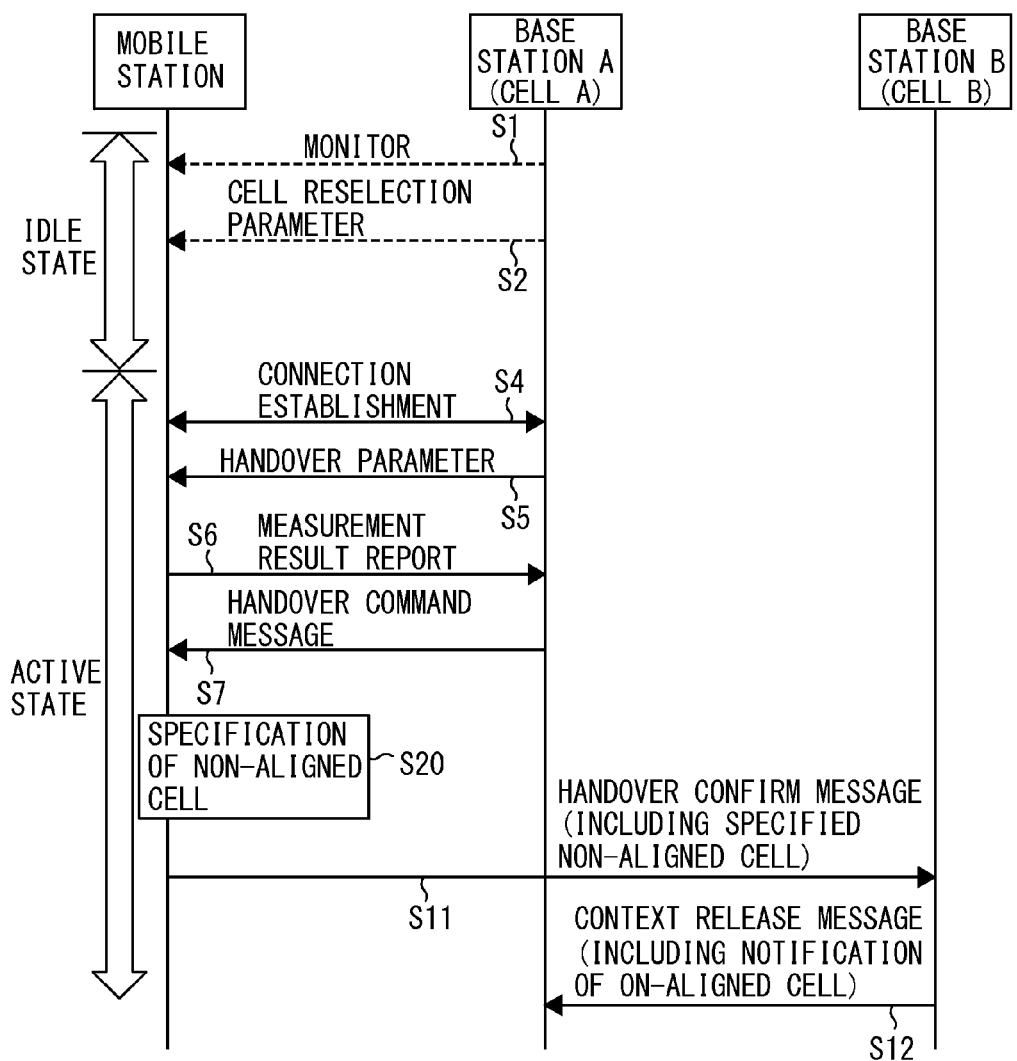

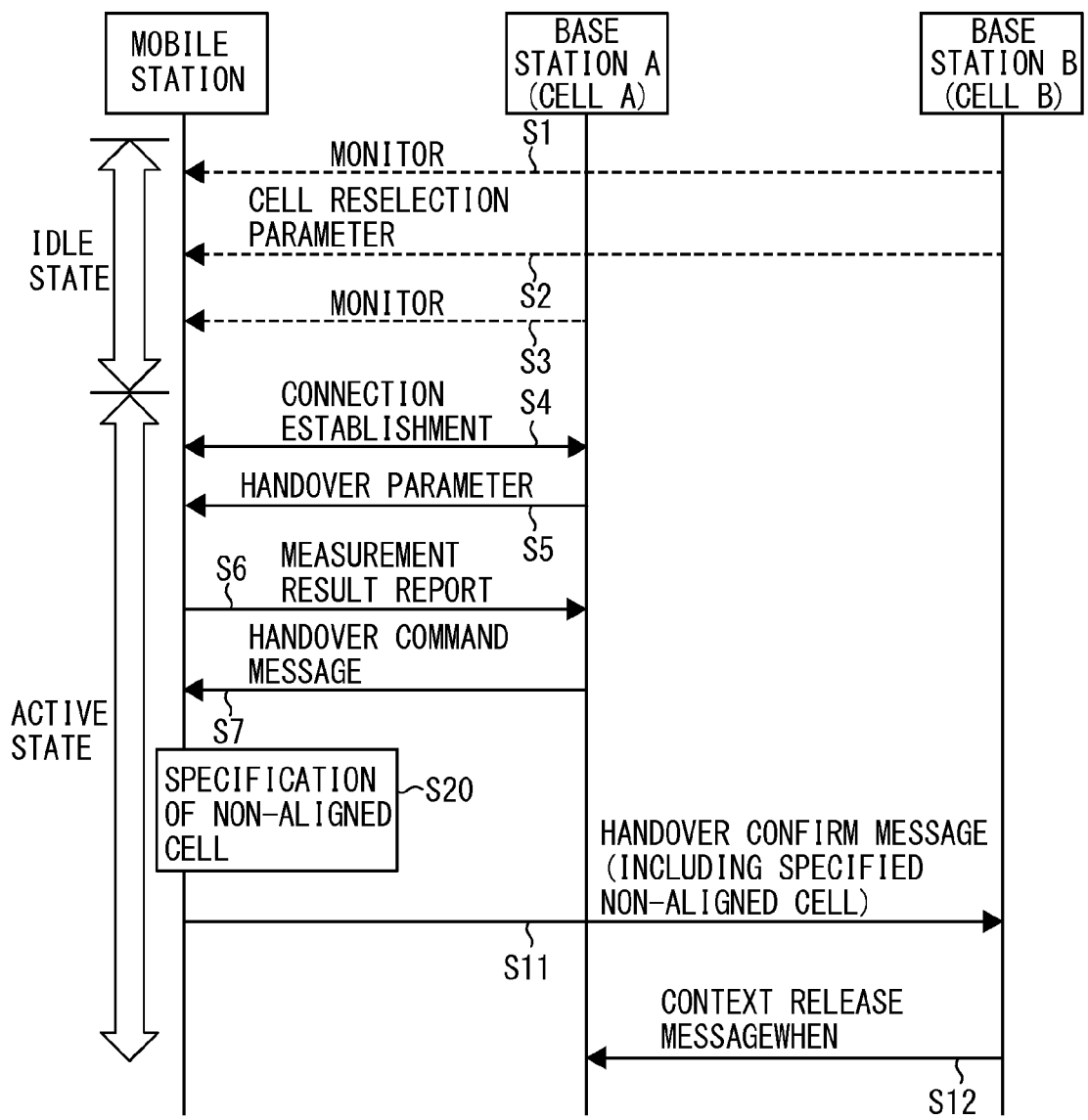

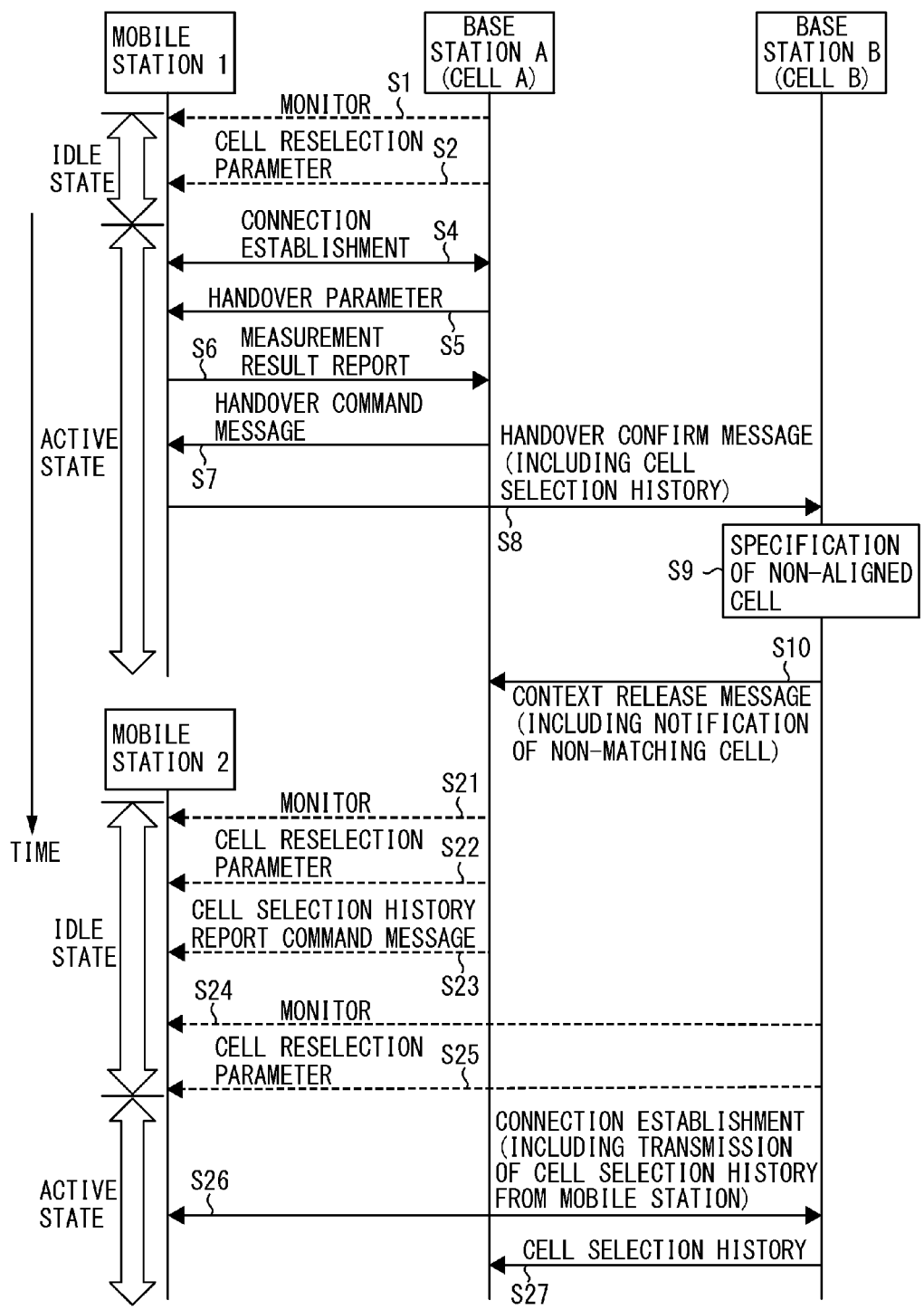

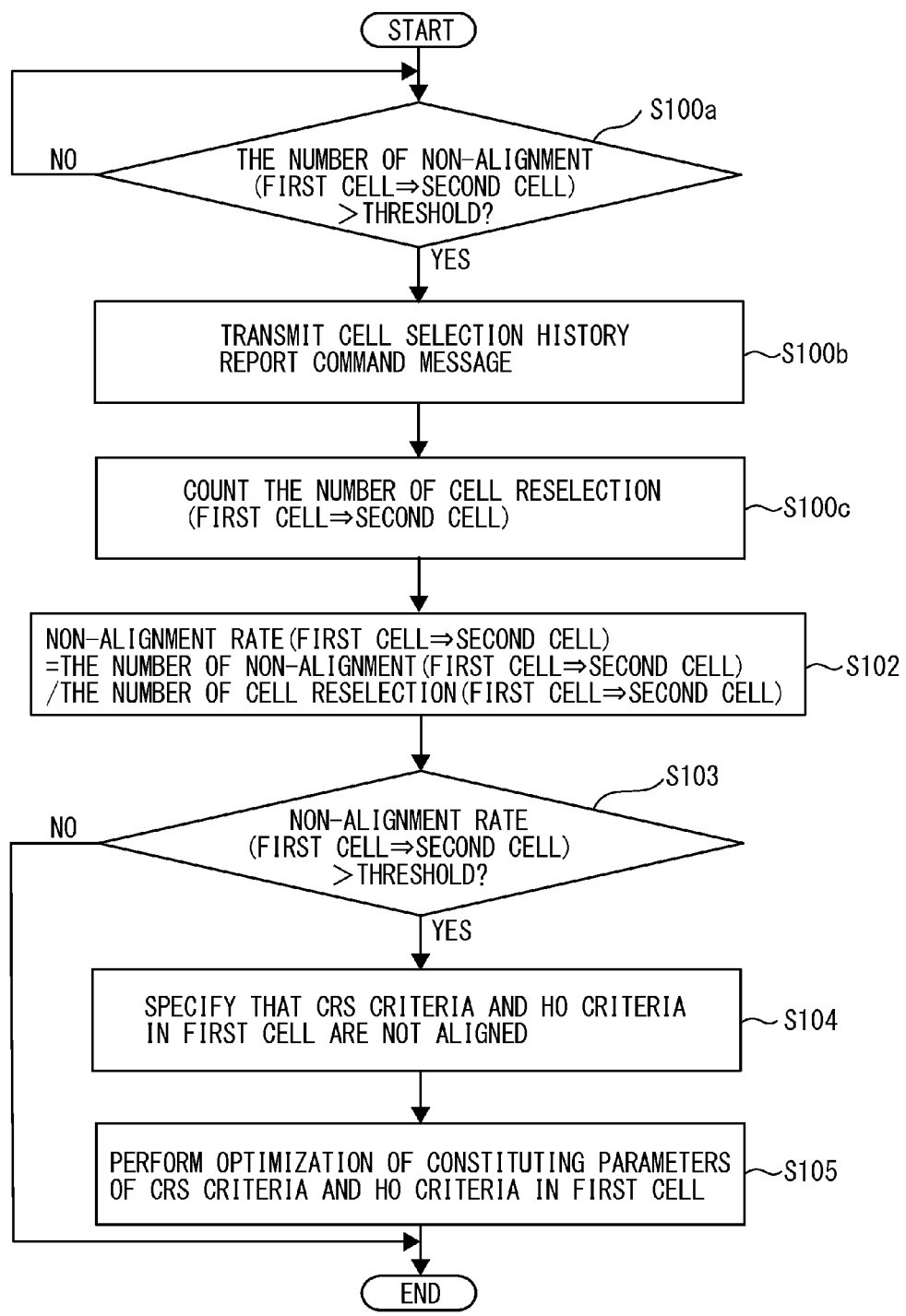

CELL SPECIFYING METHOD, BASE STATION, AND MOBILE STATION

CROSS-REFERENCE TO RELATED APPLICATIONS

This application is a continuation application based on International application No. PCT/JP2010/006466, filed on Nov. 2, 2010, the entire contents of which are incorporated herein by reference.

FIELD

The embodiment discussed herein relates to a technique of handover of a mobile station between cells in a mobile communication system, and cell reselection.

BACKGROUND

In LTE (Long Term Evolution) which is a next generation mobile communication system being a standard in 3GPP (Third Generation Partnership Project), a mobile station (UE: User Equipment) operates in an active state or in an idle state. In accordance with handover criteria (HO Criteria), the mobile station in the active state (also referred to as "connected state") selects a destination cell, and moves thereto. On the other hand, the mobile station in the idle state (also called "idle mode", "standby state/mode", "power saving state/mode") selects a destination cell in accordance with cell reselection criteria (CRS Criteria), and moves thereto. This process for movement is referred to as "cell reselection".

Basically, a mobile station measures received power of radio wave or receiving quality thereof from a serving cell (it is also referred to as a cell in which a mobile station is located), and a neighbor cell (or neighboring cell, it is also referred to as "an adjacent cell"), and moves to a target cell from a serving cell. A cell of the movement destination (target cell) of a mobile station is determined based on the handover criteria and the cell reselection criteria using the measurement result of received power or receiving quality of a mobile station. In the handover criteria and the cell reselection criteria, types of the received power/receiving quality to be measured for determination, and structure of formula, and types of parameters which constitute the formula are different, respectively. When nearly satisfying a following formula (1), a mobile station moves to a target cell.

$$P_{Target\ cell} > P_{serving\ cell} + HO\_Margin \quad (1)$$

Note that, in the formula (1), $P_{Target\ cell}$ is an index value of received power or receiving quality based on a reference signal from a target cell, and $P_{Serving\ cell}$ is an index value of received power or receiving quality based on a reference signal from a serving cell. HO_Margin is a predetermined margin. Note that the types of parameters which constitute HO_Margin are different in the handover criteria and the cell reselection criteria. Moreover, with respect to a degree that the parameters which constitute each criterion affect to the range of the cell formed by the handover criteria or the cell reselection criteria, the degree changes with radio environment to which a system is actually applied. Therefore, in a radio environment to which a system is actually applied when starting an operation of a cell in accordance with the handover criteria and the cell reselection criteria, coverage defined by the handover criteria and coverage defined by the cell reselection criteria may not be matched. In the following illustration, a state in which the coverage defined by the handover criteria and the coverage defined by the cell reselection criteria are not matched, is expressed by a state in which the coverage is "not aligned". Moreover, a cell which is not aligned is referred to as "non-aligned cell".

FIG. 1 is a diagram in which the base stations A, B and C, which are adjacent to each other, form cells A, B and C, respectively, and a diagram depicting a case where the base station A is a non-aligned cell among the base stations A, B and C. In FIG. 1, (a) depicts coverage according to the handover criteria (HO criteria), and (b) depicts coverage according to the cell reselection criteria (CRS criteria), respectively. Since the base station A is a non-aligned cell as depicted in FIG. 1, the sizes of coverage according to the handover criteria and the coverage according to the cell reselection criteria are different.

In FIG. 1, it is assumed that a mobile station (UE (P1)) in the idle state under a control of a cell A is moving toward a cell B from a cell A, as depicted in FIG. 1. In this situation, the mobile station changes into the active state from the idle state at a boundary of the cell A and the cell B, and connects with a cell (cell A) which has received a radio wave in accordance with the cell reselection criteria (UE (P2)). Then, a case can be considered where a handover is performed to another cell (cell B) in accordance with the handover criteria right after establishing a connection with the cell A (UE (P3)). In other words, supposing that the base station A is aligned, if a mobile station changes into the active state and connects with the cell A afterwards, a mobile station would have continued the connection with the cell A unless the position is changed. However, since the base station A is not aligned, above-mentioned useless handover may occur.

FIG. 2 is a diagram in which the base stations A, B and C, which are adjacent to each other, form cells A, B and C, respectively, and a diagram depicting a case where the base station B is a non-aligned cell among the base stations A, B and C. In FIG. 2, (a) depicts coverage according to the handover criteria (HO criteria), and (b) depicts coverage according to the cell reselection criteria (CRS criteria), respectively. Since the base station B is a non-aligned cell as depicted in FIG. 2, the sizes of coverage according to the handover criteria and the coverage according to the cell reselection criteria are different.

In FIG. 2, it is assumed that a mobile station (UE (P1)) in the idle state under a control of a cell B is moving toward a cell A from a cell B. In this situation, the mobile station changes into the active state from the idle state (UE (P3)) right after it moved to an area under a control of the cell A according to cell reselection criteria (UE (P2)), and establishes a connection with a cell (cell A). Then, a case can be considered where a handover is performed to another cell (cell B) in accordance with the handover criteria soon afterwards (UE (P4)). In other words, supposing that the base station B is aligned, if a mobile station changes into the active state and connects with the cell A afterwards, a mobile station would have continued the connection with the cell A unless the position is changed. However, since the base station B is not aligned, above-mentioned useless handover may occur.

FIG. 3 is a diagram in which the base stations A, B and C, which are adjacent to each other, form cells A, B and C, respectively, and a diagram depicting a case where non-aligned cell does not exist. In FIG. 3, (a) depicts coverage according to the handover criteria (HO criteria), and (b) depicts coverage according to the cell reselection criteria (CRS criteria), respectively. In FIG. 3, at each cell, the coverage defined by the handover criteria and the coverage defined by the cell reselection criteria are matched. In this case, a useless handover does not occur right after a mobile station changes from the idle state to the active state.

Currently, 3GPP is standardizing not only constituting parameters of above-mentioned handover criteria and cell reselection criteria but also SON (Self-Optimization Network) which addresses automated optimization of the various parameters. In MRO (Mobility Robustness Optimization) which is one of use cases of the SON, a problem is disclosed in which each criterion is to be adjusted to be matched by optimizing each parameter which constitutes the handover criteria and the cell reselection criteria, and occurrence of a useless handover is to be reduced.

Related art is disclosed in 3GPP TS 36.902, "Evolved Universal Terrestrial Radio Access Network (E-UTRAN); Self-configuring and self-optimizing network (SON) use cases and solutions".

SUMMARY

According to a first aspect, there is provided a cell specifying method in a cellular mobile communication system which includes a mobile station and base stations forming cells, and which operates in a first state in which the mobile station has not established a connection with a base station and in a second state in which the connection has been established with any of base stations. The method comprises storing, by the mobile station, cell selection history including selection history of the cells performed in accordance with first criteria for cell reselection in the first state, transmitting, by the mobile station, the cell selection history to the base station of a second cell when performing a handover from a first cell to the second cell in accordance with second criteria for handover in the second state, referring, by the base station of the second cell, to transmitted cell selection history, and specifying a cell in which the first criteria and the second criteria are not aligned from among the first cell and the second cell based on the cell selection history, when it is determined that the mobile station has performed the handover from the first cell to the second cell in a predetermined period after a transition from the first state to the second state.

According to a second aspect, there is provided a cell specifying method in a cellular mobile communication system which includes a mobile station and base stations forming cells, and which operates in a first state in which the mobile station has not established a connection with a base station and in a second state in which the connection has been established with any of base stations. The method comprises storing, by the mobile station, cell selection history including selection history of the cells performed in accordance with first criteria for cell reselection in the first state, referring, by the mobile station, to the cell selection history when performing a handover from a first cell to a second cell in accordance with second criteria for handover in the second state, and specifying a cell in which the first criteria and the second criteria are not aligned from among the first cell and the second cell based on the cell selection history, when it is determined that the mobile station has performed the handover from the first cell to the second cell in a predetermined period after a transition from the first state to the second state, and notifying the base station of the second cell of specified cell.

According to a third aspect, there is provided a base station in a cellular mobile communication system which operates in a first state in which the mobile station has not established a connection with a base station and in a second state in which the connection has been established with any of base stations. The base station comprises a receiving unit which receives, from the mobile station, cell selection history including selection history of the cells performed by the mobile station in accordance with first criteria for cell reselection in the first state, when the mobile station performs a handover from a first cell to the second cell in accordance with second criteria for handover in the second state, and a specifying unit which refers to the cell selection history received by the receiving unit, and specifies a cell in which the first criteria and the second criteria are not aligned from among the first cell and the second cell based on the cell selection history, when it is determined that the mobile station has performed the handover from the first cell to the second cell in a predetermined period after a transition from the first state to the second state.

According to a forth aspect, there is provided a mobile station in a cellular mobile communication system which operates in a first state in which the mobile station has not established a connection with a base station and in a second state in which the connection has been established with any of base stations. The mobile station comprises a storing unit which stores cell selection history including selection history of the cells performed in accordance with first criteria for cell reselection in the first state, a specifying unit which refers to, when performing a handover from a first cell to the second cell in accordance with second criteria for handover in the second state, the cell selection history, and specifying a cell in which the first criteria and the second criteria are not aligned from among the first cell and the second cell based on the cell selection history, when it is determined that the mobile station itself has performed the handover from the first cell to the second cell in a predetermined period after a transition from the first state to the second state, and a transmitting unit which notifies the base station of the second cell of specified cell.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 8A is a drawing for illustrating a specifying method of the non-aligned cell according to a cell selection history at the base station in the first embodiment.

FIG. 8B is a drawing for illustrating a specifying method of the non-aligned cell according to a cell selection history at the base station in the first embodiment.

FIG. 15 is a flowchart depicting operation of the mobile communication system in the third embodiment.

FIG. 16 is a flowchart depicting operation of the mobile communication system in the third embodiment.

FIG. 17 is a flowchart depicting operation of the mobile communication system in a fourth embodiment.

FIG. 18 is a flowchart depicting process by a base station in the fourth embodiment.

DESCRIPTION OF EMBODIMENTS

However, when a mobile station changes from the idle state to the active state and a handover to another cell B is performed for example right after connecting with the cell A, it is unknown, only from this phenomenon, which cell is a non-aligned cell, a cell of a handover source or a cell of a handover destination.

This is based on the following grounds. When a mobile station in the idle state moves between cells, unlike a mobile station in the active state, the mobile station moves autonomously between base stations, without transmitting to the base stations or receiving from the base stations messages such as a handover control message. Therefore, since a mobile station in the idle state monitors signals from base stations, but does not transmit a reply signal to the base stations, it is difficult for the base station to grasp a cell selected by a mobile station in the idle state. Therefore, after a base station establishes a connection with a mobile station which is changed to the active state, unless the circumstances from a time where the mobile station is in the idle state are known, the base station does not understand which cell is a non-aligned cell, a cell of a handover source or a cell of handover destination. Referring to the examples in FIG. 1 and FIG. 2, although the handover of the mobile station to the cell B is already performed in both examples, the base station B of the cell B can only recognize a fact that the handover to the cell B is performed right after connecting to the cell A. Therefore, it is not possible for the base station B to judge which situation (circumstance) it is in, FIG. 1 or FIG. 2.

When it is not possible to judge which cell is a non-aligned cell, a cell of a handover source or a cell of a handover destination, there is a problem which cell's parameters to be optimized (in other words, whether non-alignment is to be corrected) is not understood.

Accordingly, one aspect of the embodiment has a purpose to provide a cell specifying method, a base station and a mobile station, which makes it possible to specify a cell in which criterion for cell reselection and criterion for a handover of a mobile station are not aligned.

(1) First Embodiment

(1-1) Mobile Communication System

Figure 1:
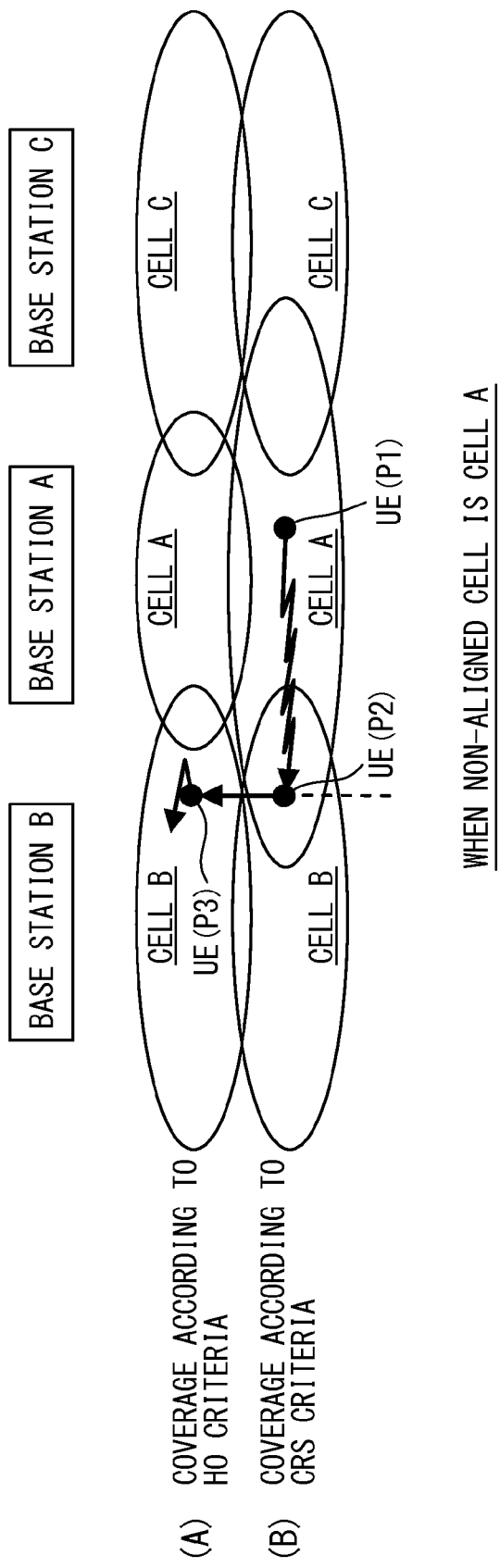
FIG. 1 is a drawing for illustrating an example of a mobile communication system including a non-aligned cell.
Figure 2:
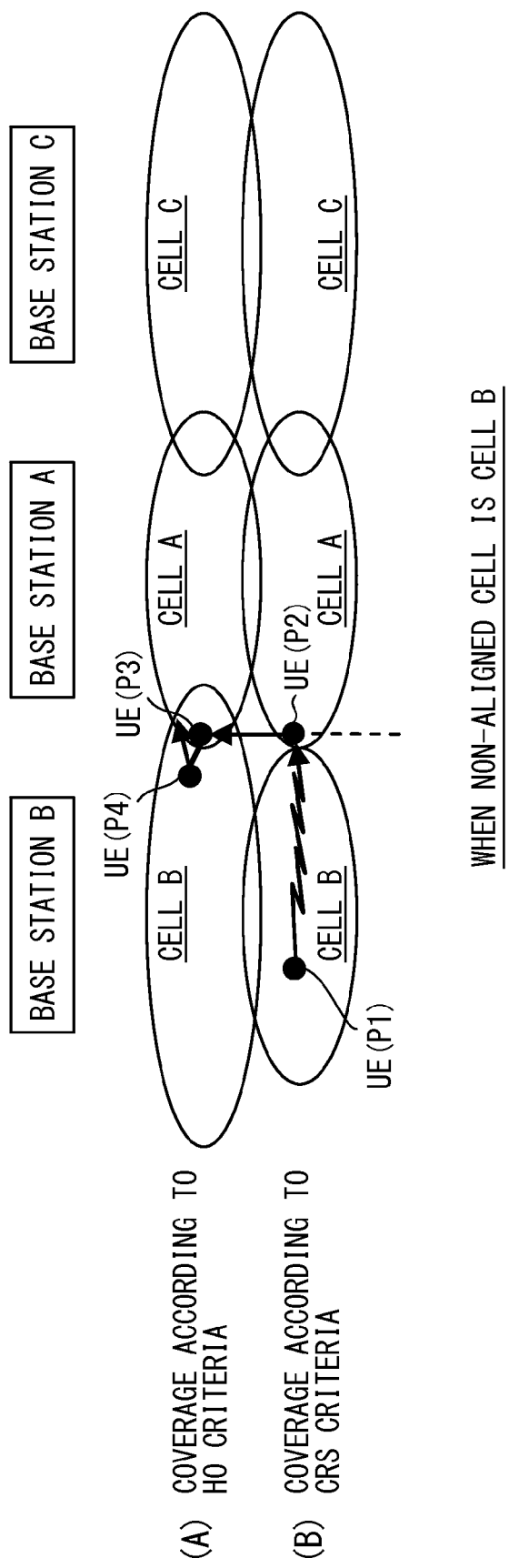
FIG. 2 is a drawing for illustrating an example of the mobile communication system including the non-aligned cell.
Figure 3:
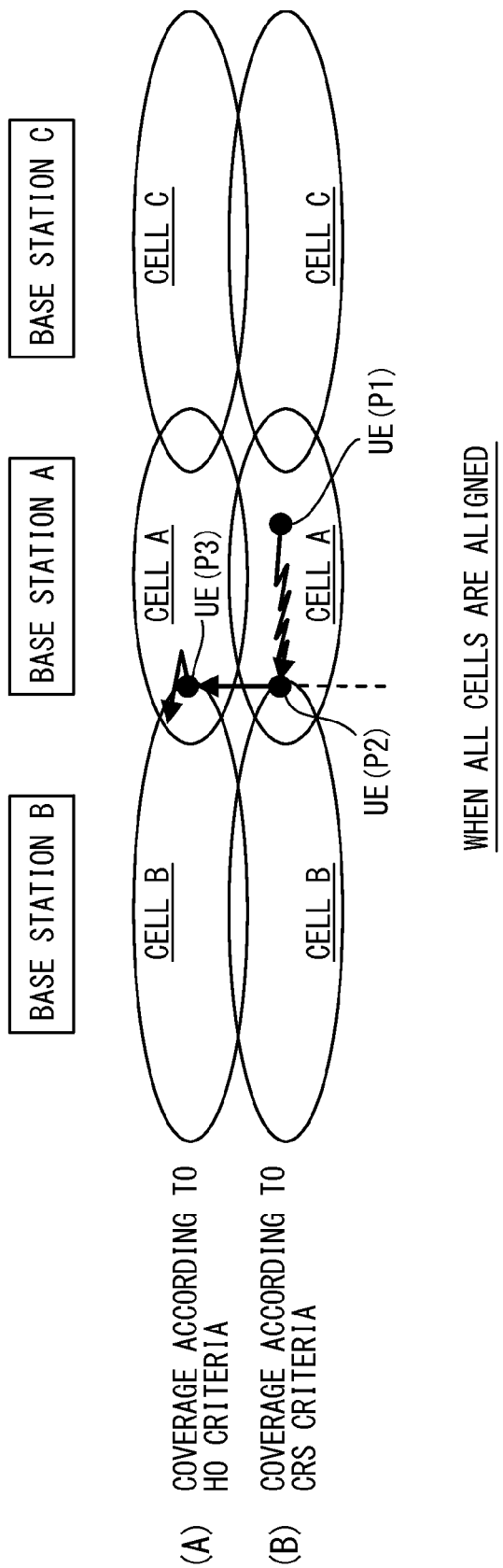
FIG. 3 is a drawing for illustrating an example of the mobile communication system which does not include the non-aligned cell.

A mobile communication system in a present embodiment, as depicted in FIG. 1 to FIG. 3, is a system of a cellular communication system in which cells A and B are formed by base stations A and B being adjacent to each other, respectively.

In the system of the present embodiment, the base station specifies a non-aligned cell from among a cell of a handover source and a cell of a handover destination (i.e. local cell), based on information regarding cell selection history notified from a mobile station. The non-aligned cell is a cell in a state where coverage defined by the handover criteria and coverage defined by the cell reselection criteria are not matched, as mentioned above.

(1-2) Constitution of Base Station and Mobile Station

Figure 4:
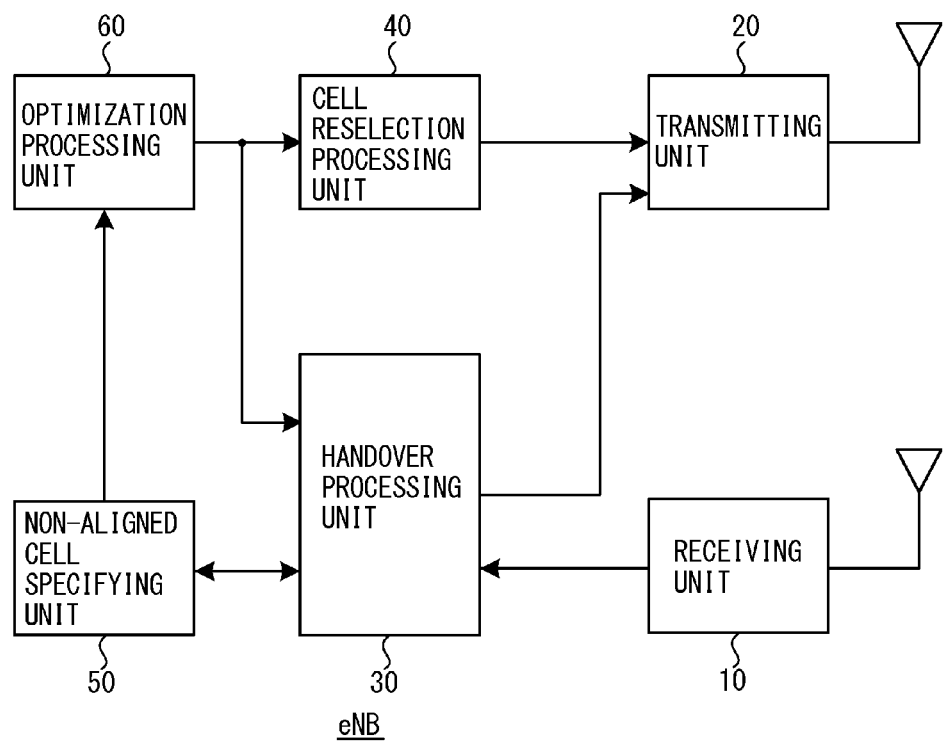
FIG. 4 is a block diagram depicting a schematic structure of a base station in a first embodiment.
Figure 5:
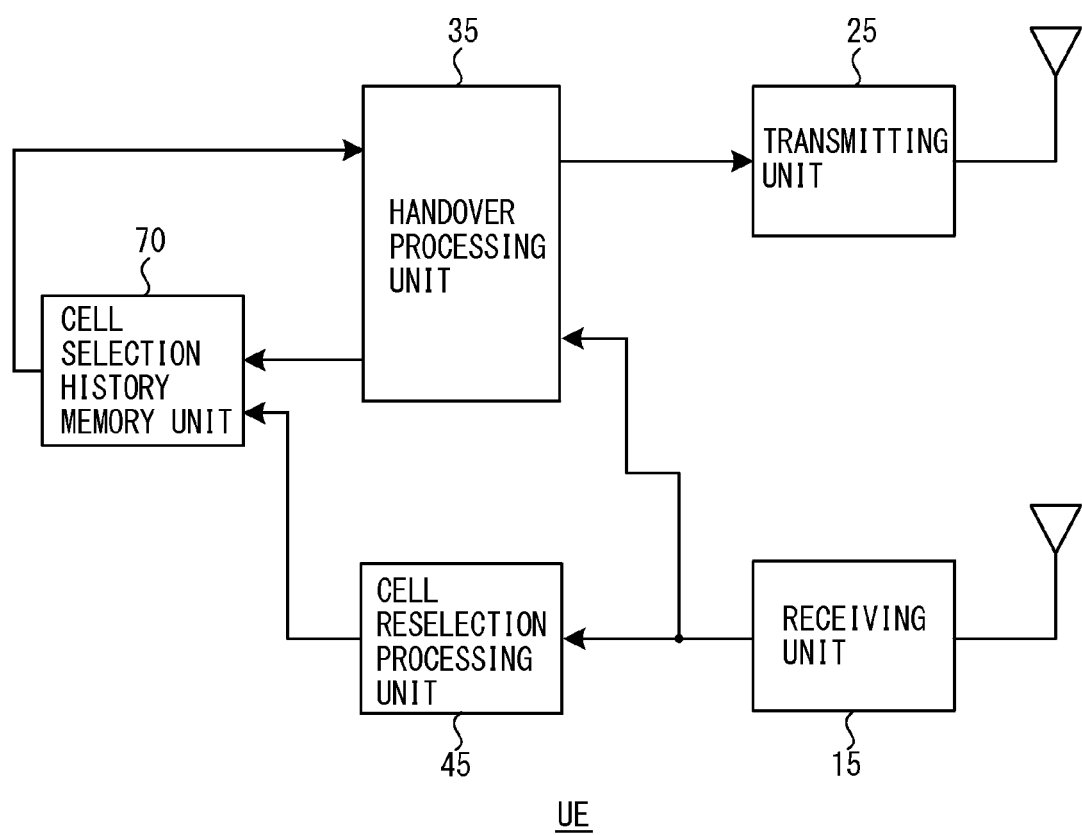
FIG. 5 is a block diagram depicting a schematic structure of a mobile station in the first embodiment.

Next, constitutions of the base station and the mobile station according to the present embodiment will be illustrated with reference to FIG. 4 and FIG. 5. FIG. 4 is a block diagram depicting a schematic structure of the base station eNB. FIG. 5 is a block diagram depicting a schematic structure of the mobile station UE.

Referring to FIG. 4, the base station eNB of the present embodiment includes a receiving unit 10, a transmitting unit 20, a handover processing unit 30, a cell reselection processing unit 40, a non-aligned cell specifying unit 50, and an optimization processing unit 60. Note that a part of receiving unit 10, a part of transmitting unit 20, the handover processing unit 30, the cell reselection processing unit 40, the non-aligned cell specifying unit 50, and the optimization processing unit 60 can be constituted by a digital circuit such as DSP (Digital Signal Processor).

The receiving unit 10 performs a process which down-converts a signal received from a receiving antenna, converting the signal into a baseband signal and into a digital signal, and a process which demodulates and decodes received data and extracts data and so on.

The transmitting unit 20 performs a process which maps data of a transmission object on a radio resource, encodes and modulates the data, a process which converts transmission data into an analog signal and up-converts the signal to the radio signal, and a process which amplifies the radio signal to send out to a transmission antenna and so on.

The handover processing unit 30 determines the necessity of a handover in accordance with the handover criteria (HO criteria), based on the measurement result (Measurement report) of the received power or receiving quality of the reference signal at the mobile station, the reference signal being transmitted from the local base station and neighboring base stations, and the measurement result being notified from each mobile station with which the local base station has established a connection. When starting a handover process, the handover processing unit 30 transmits and receives a message regarding a handover through the receiving unit 10 and the transmitting unit 20 with the mobile station and a base station (target base station) of a handover destination.

The handover processing unit 30 acquires information regarding the cell selection history in the message received from the mobile station through the receiving unit 10. The cell selection history will be described below.

The cell reselection processing unit 40 broadcasts (advertises) predetermined reference signal intermittently through the transmitting unit 20, and advertises the cell reselection parameter, based on the cell reselection criteria (CRS criteria) of local base station.

The non-aligned cell specifying unit 50 acquires the information regarding the cell selection history of each mobile station from the handover processing unit 30, and specifies the non-aligned cell. The non-aligned cell specifying unit 50 performs a predetermined notification to the handover processing unit 30, when it is determined that the cell of the neighboring base station of the handover source is the non-aligned cell. In accordance with the notification, the handover processing unit 30 generates a message addressed to the neighboring base station which reports that the cell of the neighboring base station of the handover source is the non-aligned cell. The non-aligned cell specifying unit 50 performs a predetermined notification to the optimization processing unit 60, when it is determined that the cell of the local base station is the non-aligned cell.

The optimization processing unit 60 performs, when the local cell is the non-aligned cell, a process (hereinafter called "optimization" or "optimization processing") which corrects the parameters of the handover criteria or the cell reselection criteria so that the coverage defined by the handover criteria and the coverage defined by the cell reselection criteria are matched. The optimization processing will be described below.

Next, referring to FIG. 5, the mobile station UE of the present embodiment includes a receiving unit 15, a transmitting unit 25, a handover processing unit 35, a cell reselection processing unit 45, and a cell selection history memory unit 70. Note that a part of receiving unit 15, a part of transmitting unit 25, the handover processing unit 35, the cell reselection processing unit 45, and the cell selection history memory unit 70 can be constituted by a digital circuit such as DSP (Digital Signal Processor).

The receiving unit 15 performs a process which down-converts a signal received from a receiving antenna, converts the signal into a baseband signal, and converts the signal into a digital signal, and performs a process which demodulates and decodes received data and extracts data and so on.

The transmitting unit 25 performs a process which maps data of a transmission object on a radio resource, and encodes and modulates the data, a process which converts transmission data into an analog signal and up-converts the signal to the radio signal, and a process which amplifies the radio signal to send out to a transmission antenna and so on.

The handover processing unit 35, when the mobile station is in the active state, measures the received power or receiving quality of the reference signal at the mobile station, the reference signal being transmitted from the base station which has an established connection with the mobile station and the neighboring base stations of the base station, and transmits the measurement result (Measurement report) to the base station through the transmitting unit 25. Moreover, the handover processing unit 35, when starting the handover process, transmits and receives a message regarding a handover between a base station of a handover source (source base station), and a base station of a handover destination (target base station) through the receiving unit 15 and the transmitting unit 25.

The handover processing unit 35 transmits a message including the information regarding the cell selection history stored in the cell selection history memory unit 70 to the base station through the transmitting unit 25.

The cell reselection processing unit 45 monitors the predetermined reference signal advertised from the base station through the receiving unit 15, and receives the reference signal intermittently, and receives the signal of the cell reselection parameter advertised from the base station. Moreover, the cell reselection processing unit 45 selects a cell in accordance with the cell reselection criteria (CRS criteria) which is based on the cell reselection parameter acquired from the base station when the mobile station is in the idle state.

The selection results of the cell when the mobile station is in the idle state and the active state is notified to the cell selection history memory unit 70 one by one from the cell reselection processing unit 45 and the handover processing unit 35, respectively, and the cell selection history memory unit 70 stores the selection result in order of a time series as the cell selection history. This cell selection history is referred by the handover processing section 35.

(1-3) Operation of Mobile Communication System

Figure 6:
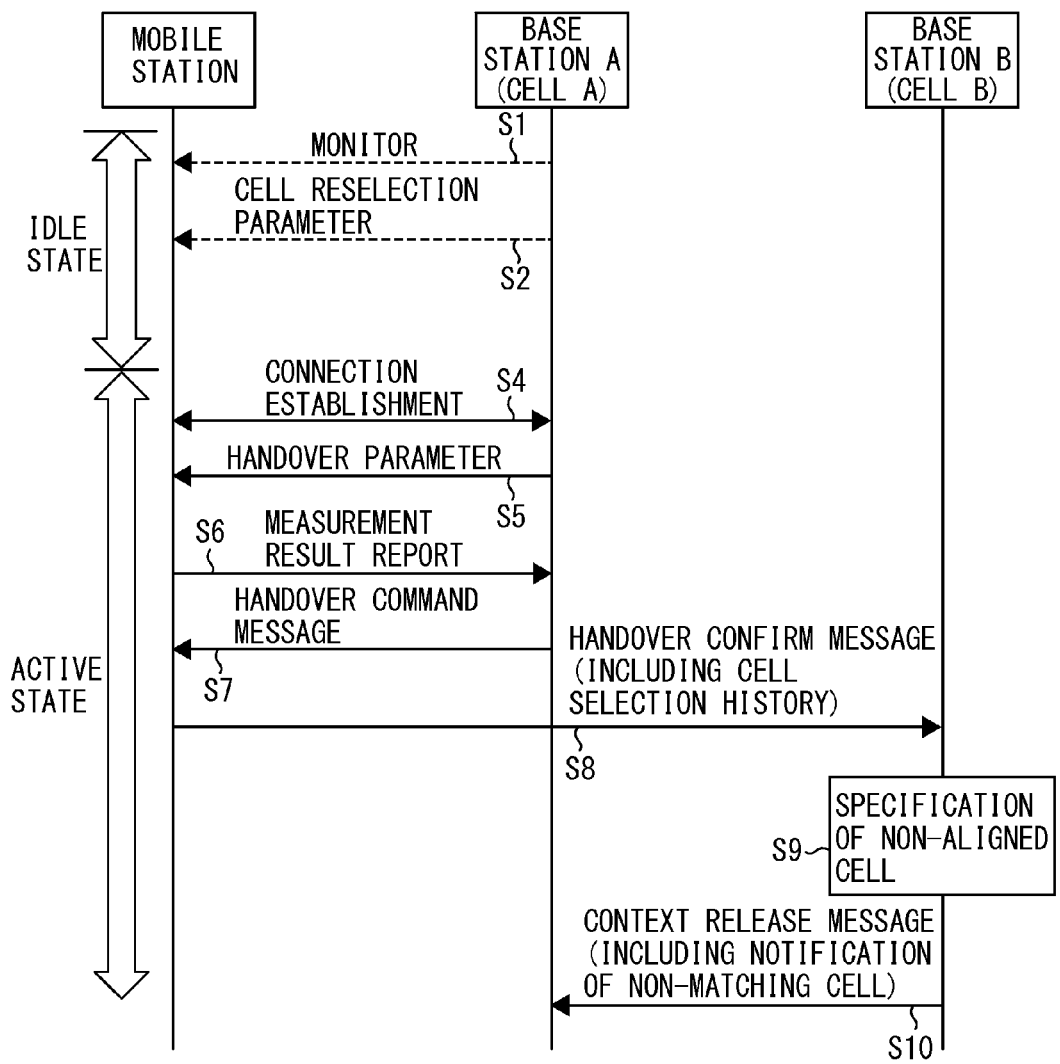
FIG. 6 is a flowchart depicting operation of the mobile communication system in the first embodiment.
Figure 7:
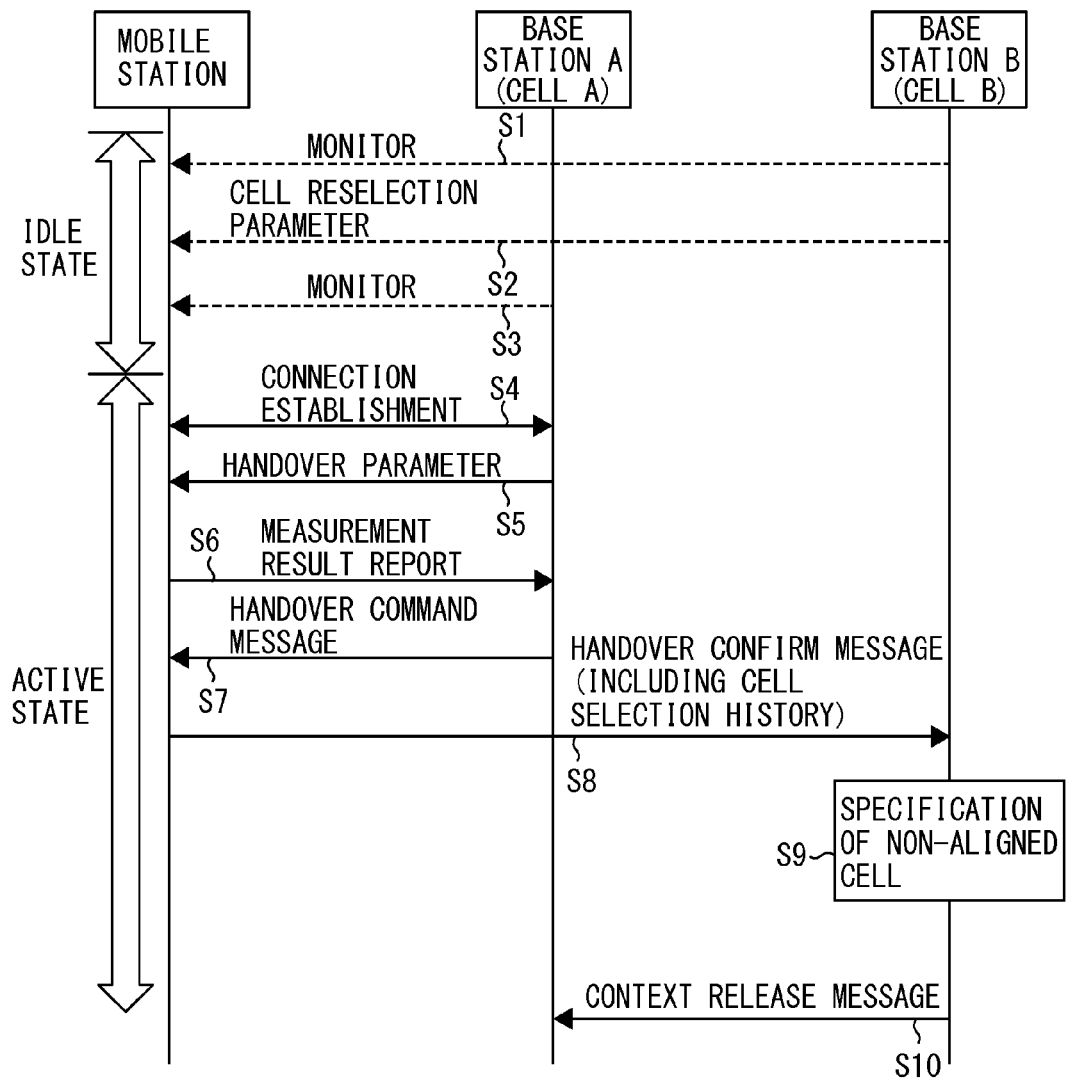
FIG. 7 is a flowchart depicting operation of the mobile communication system in the first embodiment.

Next, an operation of the mobile communication system including the mobile station and the base stations A and B which are adjacent to each other, will be illustrated with reference to FIGS. 6 to 8. FIG. 6 is a flowchart depicting operation of the mobile communication system when the cell A of the base station A is the non-aligned cell. FIG. 7 is a flowchart depicting operation of the mobile communication system when the cell B of the base station B is the non-aligned cell. FIG. 8 is a drawing for illustrating the method for specifying the non-aligned cell according to the cell selection history.

(1-3-1) When Cell A is Non-Aligned Cell

Referring to FIG. 6, the mobile station is in the idle state and has selected the cell A. The cell reselection processing unit 45 of the mobile station monitors the predetermined reference signal advertised from the base station A through the receiving unit 15 to receive the reference signal intermittently (step S1), and receives the signal of the cell reselection parameter advertised from the base station A (step S2). At this time, since neither the base station A nor the base station B has established the connections with the mobile station, it is not possible for the base station A or the base station B to recognize from which cell the mobile station monitors the signal.

Next, it is assumed that the mobile station changes from the idle state to the active state, and has established a connection with the base station A (step S4). In this case, the handover processing unit 35 in the mobile station transmits and receives a control message with the base stations A. The message transmitted to the mobile station from the base station A includes parameters regarding a handover (step S5). The parameters regarding the handover includes a threshold of handover criteria, and the mobile station transmits the measurement result (Measurement report) of the received power or the receiving quality to the base station, when satisfying the handover criteria, based on the threshold. Moreover, after the mobile station and the base station A establishes a connection, the base station can recognize the cell selection operation of the mobile station by a transfer of the control message between the mobile station and the base station.

In a case depicted in FIG. 6, since the handover criteria based on the above-mentioned threshold are immediately satisfied at the mobile station A right after establishing the connection in the step S4, the measurement results of the received power or the receiving quality of the reference signals from the base station A and the base station B which is a neighboring base station are transmitted (step S6). In the base station A which received the measurement report, the handover processing unit 30 generates a handover command message (HO Command Message) in which the cell of the movement destination is designated, and transmits the message to the mobile station (step S7). In the mobile station, the handover processing unit 35 generates a handover confirm message (HO Confirm Message) according to the handover command message. The handover confirm message is transmitted to the base station B of the cell B designated by the handover command message (step S8).

In the present embodiment, the information regarding the cell selection history is included in the above-mentioned handover confirm message. As mentioned above, in the mobile station, the selection results of the cell when the mobile station is in the idle state and the active state are stored in order of the time series as the cell selection history in the cell selection history memory unit 70. The handover processing unit 35 of the mobile station refers to the cell selection history stored in the cell selection history memory unit 70, when generating the handover confirm message.

In the base station B which received the handover confirm message, the non-aligned cell specifying unit 50 specifies the non-aligned cell from among the cell A and the cell B based on the acquired cell selection history (step S9).

The method for specifying the non-aligned cell will be illustrated with reference to FIG. 8.

As the flowchart depicted in FIG. 6, such two patterns as pattern A depicted in FIG. 8A and pattern B depicted in FIG. 8B can be considered for a case in which the mobile station performs a handover to the cell B right after becoming the active state and establishing a connection with the cell A. Note that, in FIG. 8, it is assumed that time elapses in ascending order of item numbers.

The pattern A in FIG. 8A illustrates that a state selecting the cell A in the idle state is long (item number is 1), and right after changing to the active state (item number is 2), a handover to the cell B is performed (item number is 3). In this case, the mobile station moves cell A=>cell A=>cell B continuously, and therefore the cell reselection of the cell A from the item number 1 to the item number 2 is inappropriate. It can be considered that the cell reselection criteria constituted by the cell reselection parameter from the cell A are not aligned with the handover criteria. Accordingly, it can be determined that the handover criteria and the cell reselection criteria are not aligned in the cell A.

The pattern B in FIG. 8B indicates that a state selecting the cell B in the idle state is long (item number is 1), the cell A is next selected (item number is 2), and right after changing to the active state (item number is 3), an handover to the cell B is performed (item number is 4). In this case, the mobile station moves cell B=>cell A=>cell B continuously, and therefore the cell reselection from the cell B to the cell A which is from the item number 1 to the item number 2 is inappropriate. It can be considered that the cell reselection criteria constituted by the cell reselection parameter from the cell B are not aligned with the handover criteria. Accordingly, it can be determined that the handover criteria and the cell reselection criteria are not aligned in the cell B.

Note that, in determining whether it corresponds to the pattern A or the pattern B, a threshold of a length of period located in an area of a cell can be set arbitrarily. For example, the threshold of the length of period located in the area for determining as "short" may be set equal to or less than 10 seconds.

Return to illustration of FIG. 6, after specifying the non-aligned cell in the step S9, it is assumed that the cell A is the non-aligned cell. In this case, a context release message of the mobile station transmitted from the base station B to the base station A includes a notification of the cell A being the non-aligned cell (step S10).

(1-3-2) When Cell B is Non-Aligned Cell

In the pattern B as depicted in FIG. 8B, a state in which the mobile station in the idle state selects the cell B is long. Therefore, in FIG. 7 depicting a case in which the cell B is the non-aligned cell, the signal from the base station B is received in the steps S1 and S2. In FIG. 7, steps S4 to S9 are the same as the steps depicted in FIG. 6. In FIG. 7, it is assumed that the cell B is the non-aligned cell after specifying the non-aligned cell in the step S9. In this case, although the context release message of the mobile station is transmitted from the base station B to the base station A (step S10), it is not necessary to include the notification of the cell B being the non-aligned cell in this message.

As mentioned above, in the mobile communication system of the present embodiment, since the base station acquires the cell selection history of the mobile station in the idle state, the base station can specify the cell in which the cell reselection criteria and the handover criteria are not aligned based on the cell selection history.

Moreover, the mobile station does not feed back the cell selection history in the idle state to the base station in all cases, but it is preferable that the mobile station feeds back the cell selection history, only when a handover is performed right after the mobile station establishes a connection with the base station and changes to the active state. Accordingly, the traffic of a message transmission and reception due to the feedback of the cell selection history can be suppressed.

(1-4) Another Constitution of Base Station and Mobile Station

Figure 9:
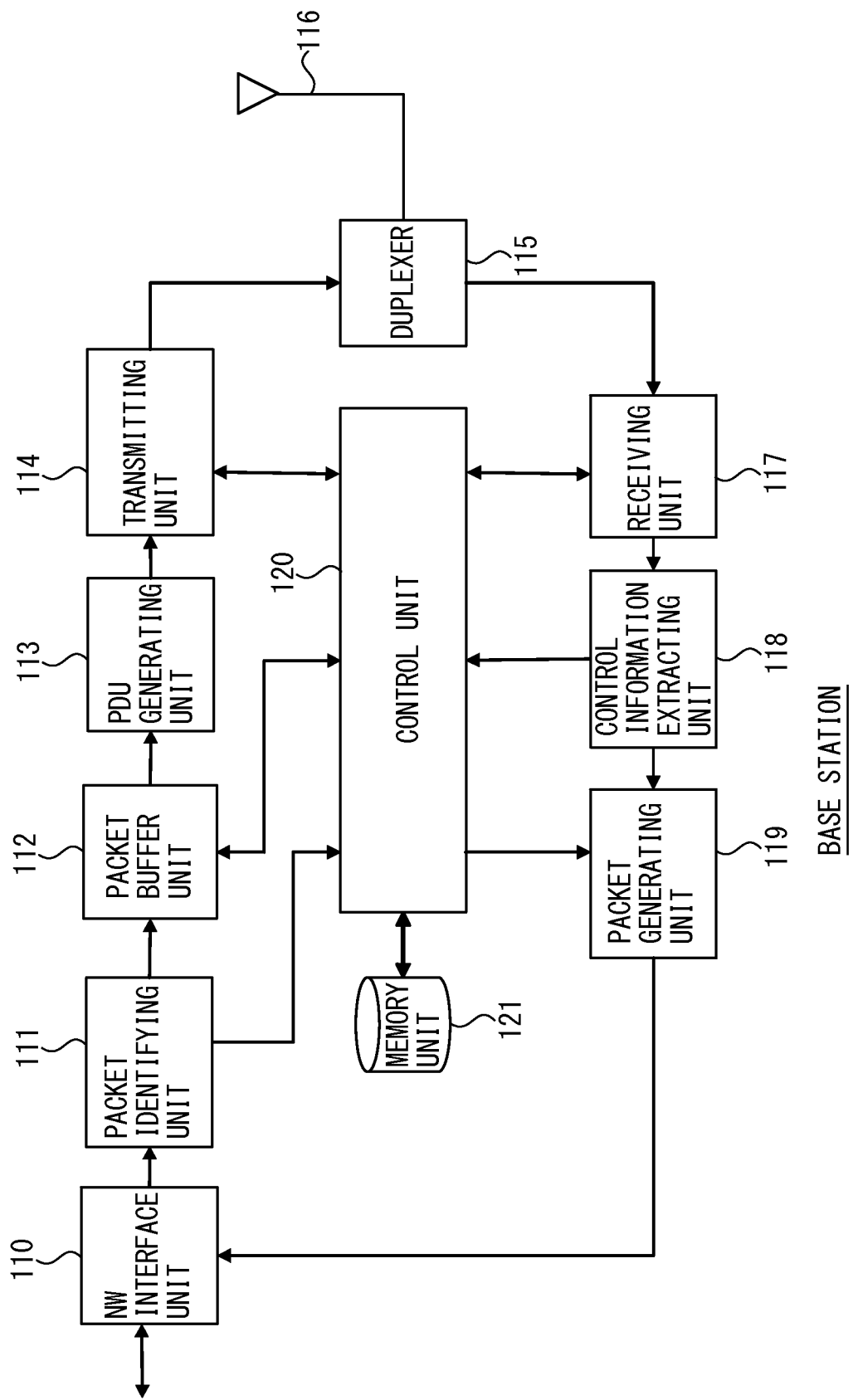
FIG. 9 is a block diagram depicting another schematic structure of the base station in the first embodiment.
Figure 10:
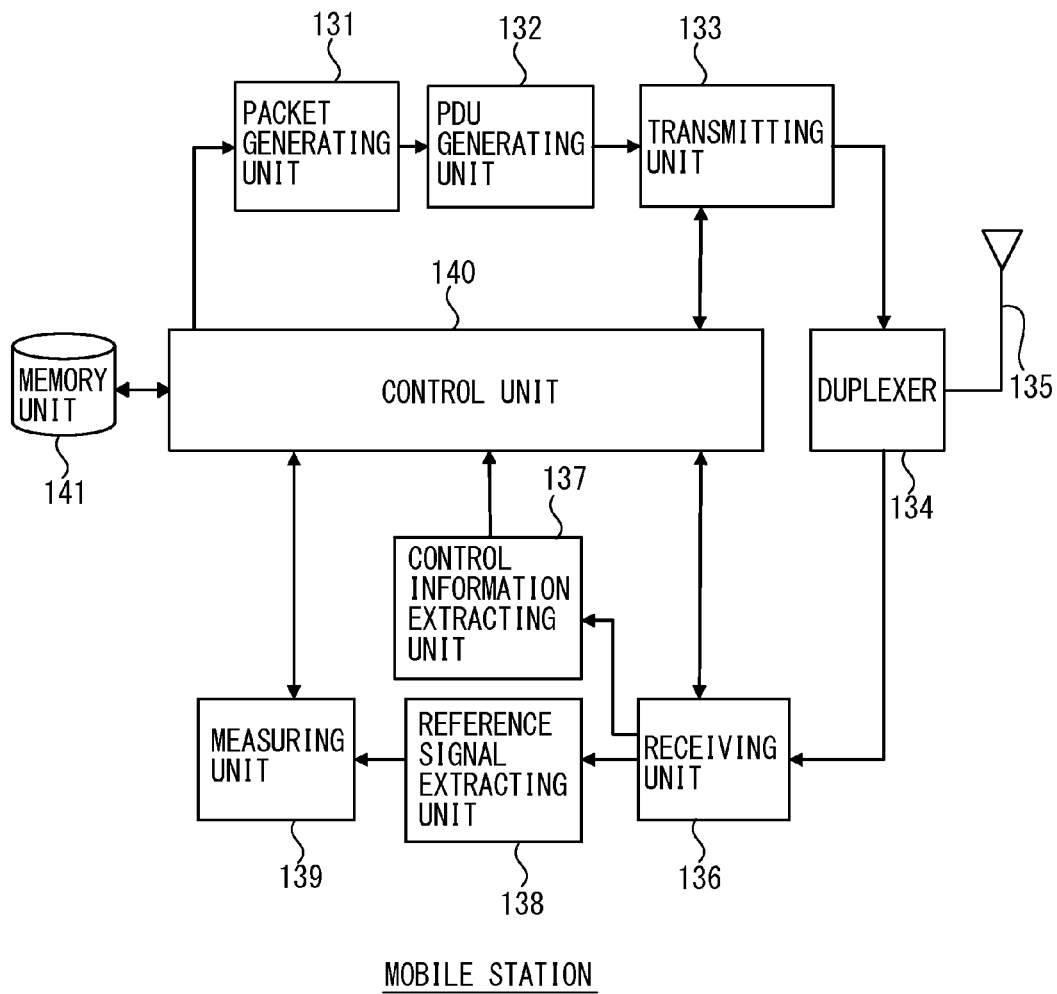
FIG. 10 is a block diagram depicting another schematic structure of the mobile station in the first embodiment.

The specifying process of the non-aligned cell mentioned above can be realized by a base station and a mobile station which have different constitutions from constitutions depicted in FIG. 4 and FIG. 5. The configuration example of the base station and the mobile station will be illustrated with reference to FIG. 9 and FIG. 10. FIG. 9 is a block diagram depicting a schematic structure of the base station eNB. FIG. 10 is a block diagram depicting a schematic structure of the mobile station UE.

Referring to FIG. 9 first, the base station includes a NW (Network) interface unit 110, a packet identifying unit 111, a packet buffer unit 112, a PDU generating unit 113, a transmitting unit 114, a duplexer 115, an antenna 116, a receiving unit 117, a control information extracting unit 118, a packet generating unit 119, a control unit 120, and a memory unit 121. The duplexer 115 is provided so that the antenna 116 is shared for transmission and reception.

In FIG. 9, the NW interface unit 110 is an interface for communicating with an upper-layer apparatus or other base stations through a network, and receives the packet from the network, and transmits the packet to the network. The packet identifying unit 111 identifies the packet which is addressed to the mobile station under a control of the local base station and which is received from the network, and stores the packet in the packet buffers provided for respective mobile stations in the packet buffer unit 112. When the message (packet) from the neighboring base station is received, the message is transferred to the control unit 120.

The PDU generating unit 113 combines the packets or decomposes the packet to convert into the data unit for transmitting to radio. The transmitting unit 114 encodes and modulates the data which is made into PDU format, and transmits data to the mobile station through the antenna 116.

On the other hand, the receiving unit 117 demodulates and decodes the data from the mobile station. When the data from the mobile station is control information such as Measurement Report, the control information extracting unit 118 transfers the data to the control unit 120. When the data from the mobile station is data towards the network, the control information extracting unit 118 transfers the data to the packet generating unit 119. The packet generating unit 119 converts the data from the mobile station into the packets, and transfers the packets to the NW interface unit 110.

The control unit 120 controls the transmitting unit 114 and the receiving unit 117, and performs the scheduling process in a radio section. A load factor of a radio resource is also calculated from the transmitting unit 114 or the receiving unit 117. The load factor is an index which indicates a ratio of a processing amount to an upper limit of the processing capability of the base station. Although the calculation method of the processing amount is not limited to such a manner, it is possible, for example, to adopt a method of measuring the amount per time of the resource blocks or the number of packets (the number of PDU) which is currently processed by the control unit 120, or a method of the amount which is an average of the samples within a predetermined period, or a method of measuring a throughput, and so on.

The control unit 120 generates a Measurement Report establishing update request addressed to neighboring base station, when adjusting (for example, decreasing) the load of local base station, based on a predetermined determination criteria (threshold) and the calculated load factor of local base station. The Measurement Report establishing update request is provided to the packet generating unit 119. The control unit 120 receives a Measurement Report establishing update response from the neighboring base station from the packet identifying unit 111. The control unit 120 provides RRC Connection Reconfiguration which includes a new Measurement Report establishing to the packet buffer unit 112, when changing the Measurement Report establishing.

On the other hand, the control unit 120 calculates the load factor of the base station when receiving the Measurement Report establishing update request from the neighboring base station from the packet identifying unit 111, and generates the Measurement Report establishing update response based on the calculated result to provide the packet generating unit 119.

The memory unit 121 stores the calculated load factor, the value of the parameter of Measurement Report and so on.

Next, referring to FIG. 10, the mobile station includes a packet generating unit 131, a PDU generating unit 132, a transmitting unit 133, a duplexer 134, an antenna 135, a receiving unit 136, a control information extracting unit 137, a reference signal extracting unit 138, a measuring unit 139, a control unit 140, and a memory unit 141. Note that, in the constitution of the mobile station in FIG. 10, the packet generating unit 131, the PDU generating unit 132, the transmitting unit 133, the duplexer 134, the antenna 135, and the receiving unit 136 are the same as the corresponding units in the base station mentioned above, respectively, in the viewpoint of a function. Therefore, redundant illustration is hereinafter avoided.

In FIG. 10, the reference signal extracting unit 138 extracts known reference signal from the received signal which is from the base station. The measuring unit 139 measures the received power or receiving quality of the extracted reference signal.

The control unit 140 acquires the RRC Connection Reconfiguration message including establishing information of Measurement Report from the base station through the receiving unit 136, and stores the establishing information of Measurement Report into the memory unit 141. The control unit 140 determines whether the received power or receiving quality measured by the measuring unit 139 satisfies a predetermined conditional formula, based on a parameter value of the acquired establishing information of Measurement Report. As a result, the control unit 140 controls the packet generating unit 131 so as to transmit the Measurement Report message to the base station, when satisfying the above-mentioned transmission condition of the Measurement Report.

(2) Second Embodiment

Next, a second embodiment will be described.

In the first embodiment, a method has been illustrated which specifies the non-aligned cell from among two adjacent cells, and notifies the base station forming the non-aligned cell. By this means, the base station which forms the non-aligned cell can perform a process for correcting the non-alignment of the coverage defined by the handover criteria and the coverage defined by the cell reselection criteria. However, before performing the process for correcting the non-alignment of the coverage described above, it is preferable to determine more reliably that the cell of local base station is the non-aligned cell. For this reason, the present embodiment illustrates a method in which feedback of the cell selection history of each mobile station is processed statistically, and the non-aligned cell is reliability specified.

Note that the base station in the present embodiment may have the same constitution as the constitution depicted in FIG. 4.

The first embodiment has illustrated a method for specifying the non-aligned cell in the two neighboring cells, A and B. However, a cell to which a certain cell is adjacent is not the only one, but there may be two or more cells. In this case, regarding a certain cell, the cell reselection parameter which constitutes the cell reselection criteria, and the handover parameter which constitutes the handover criteria are provided for each cell of the movement destination. In other words, regarding the cell A, the cell reselection parameter/handover parameter to the movement destination cell B from the movement source cell A is different from the cell reselection parameter/handover parameter from the movement source cell A to the movement destination cell C. Therefore, regarding the cell A, a fact that the cell reselection criteria from the movement source cell A to the movement destination cell B and the handover criteria are not aligned, does not always mean that the cell reselection criteria and the handover criteria from the movement source cell A to the movement destination cell C are not aligned. In the following illustration, when the cell reselection criteria and the handover criteria from a first cell to a second cell are not aligned regarding the first cell, it is written as "non-alignment (first cell->second cell)." For example, FIG. 8A is determined as "non-alignment (A->B)" and FIG. 8B is determined as "non-aligned cell (B->A)."

In the base station according to the present embodiment, the non-aligned cell specifying unit 50 determines the non-aligned cell based on the cell selection history acquired from the mobile station, and the optimization processing unit 60 counts the determining result by the non-aligned cell specifying unit 50. For example, in the examples of FIGS. 8A and 8B, the number of non-aligned (A->B) and the number of non-aligned (B->A) count.

Figure 11:
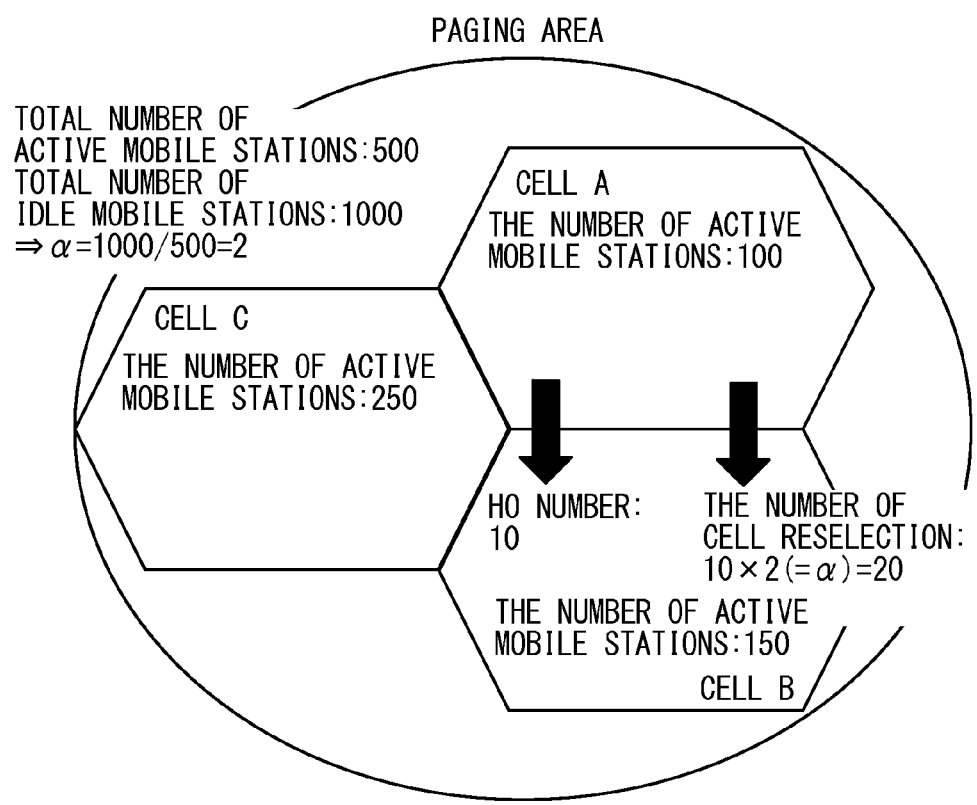
FIG. 11 is a drawing for illustrating a specifying method of the non-aligned cell at a base station in a second embodiment.

In the base station according to the present embodiment, after counting a predetermined amount of the determining result of the non-aligned cell or after counting the determining result for a predetermined period, a statistical process is performed to specify the non-aligned cell with high accuracy. The statistical process is illustrated with reference to FIG. 11. FIG. 11 is a drawing for illustrating a specifying method of the non-aligned cell at the base station in the present embodiment.

FIG. 11 depicts a paging area including the cells A to C as an example. The paging area (calling area) is also called a paging group. It is impossible for the base station to recognize a movement of the mobile station in the idle state (hereinafter referred to as "idle mobile station") over the cells, and to grasp which cell a certain idle mobile station is under control of. However, the base station grasps which paging area a certain idle mobile station is under control of. This is because a communication specification specifies so that an idle mobile station performs a position registration to the base station when moving over the paging areas. On the other hand, when moving over the cells in the paging area, the idle mobile station does not perform the position registration to the base station. By these processes, while reducing the power consumption by a process of position registration, the base station in the paging area in which the idle mobile station exists advertises an incoming message (paging message) when a certain idle mobile station receives an incoming call, and thereby, the incoming call is notified to the idle mobile station.

Since the base station has understood which paging area the certain idle mobile station is under a control of as mentioned above, the base station can acquire the total number of the idle mobile stations in the paging area. For example, the base station can access HLR (Home Location Register) which manages the paging area to which the cell of local base station belongs to acquire the total number of the idle mobile stations. In the example depicted in FIG. 11, the total number of the idle mobile stations in the paging area is 1000.

Since the base station has understood the handover operation of the mobile station in the active state (hereinafter, referred to as "active mobile station"), the base station knows the total number of the active mobile stations in each cell and the total number of the active mobile stations in the paging area. In the example depicted in FIG. 11, the numbers of active mobile stations of the cell A, cell B and cell C are 100, 150 and 250, respectively, and the total number of the active mobile stations in the paging area is 500. In this case, the ratio ($\alpha$) of the number of idle mobile stations to the number of active mobile stations is 2 (=1000/500).

Assuming that the ratio of the number of the idle mobile stations in the paging area to the number of the active mobile stations can be applied to each cell in the paging area, the number of cell reselection in the period can be estimated when the number of handover from the cell A to the cell B in a predetermined period is understood. For example, in the example depicted in FIG. 11, when supposing that the number of handovers (the number of HO) from the cell A to the cell B in a predetermined period is ten, the number of cell reselection (A=>B) from the cell A to the cells B can be estimated to be 20 (=10×2 (value of $\alpha$)).

Figure 12:
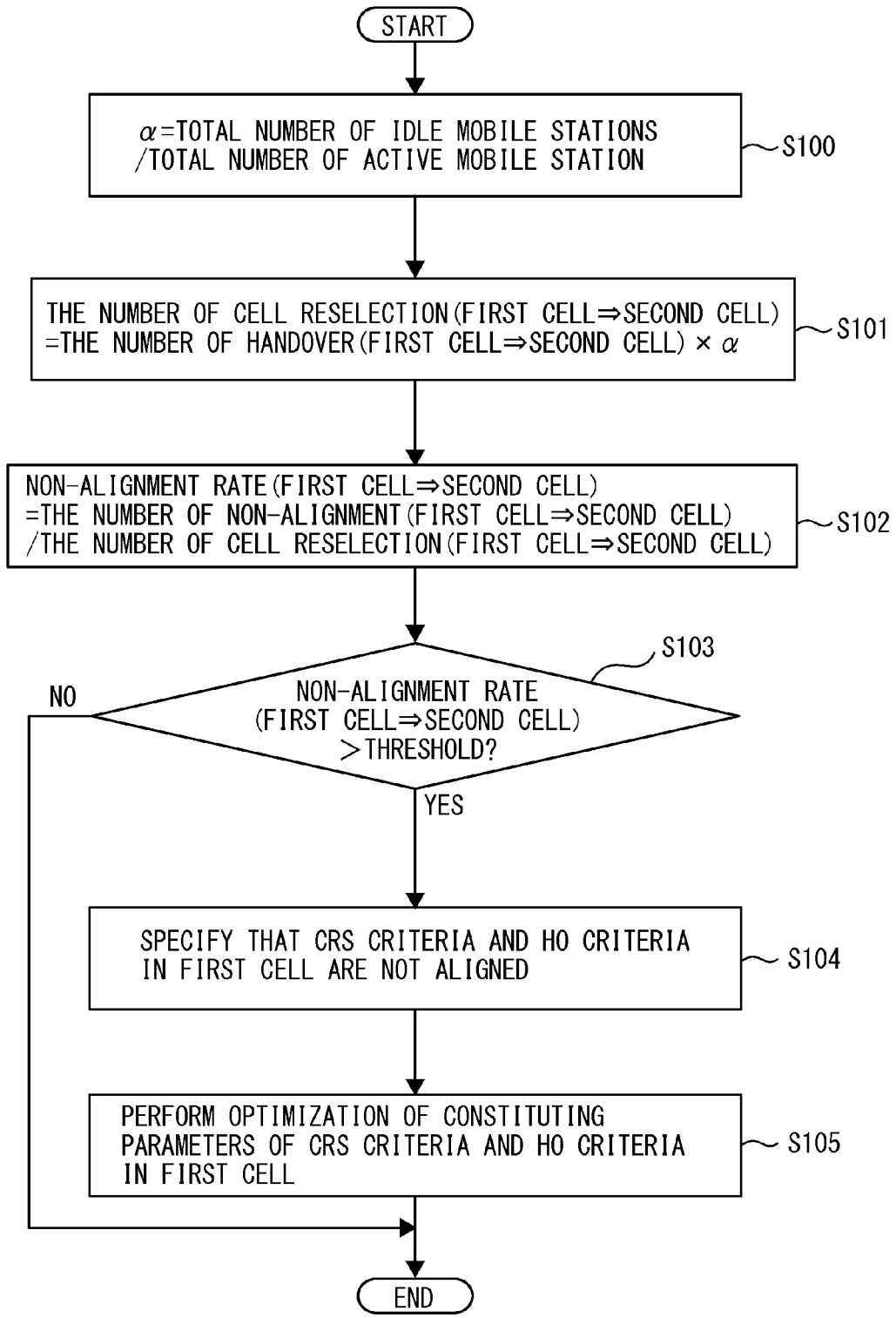
FIG. 12 is a flowchart depicting a process by the base station in the second embodiment.

Next, with reference to FIG. 12, the process which is performed by the base station of the present embodiment and includes a method of specifying the non-aligned cell will be illustrated. FIG. 12 is a flowchart depicting a process in the base station in the present embodiment. The flowchart depicted in FIG. 12 includes the process after acquiring the cell selection history to optimizing a parameter. The process is mainly performed by the optimization processing unit 60 in the base station.

Note that following illustrates the process of concrete example depicted in FIG. 11 using the flowchart of FIG. 12, in a case where a first cell and a second cell are associated with the cell A and the cell B, respectively.

Referring to FIG. 12 first, the optimization processing unit 60 calculates the ratio ($\alpha$) of the number of idle mobile stations to the number of active mobile stations, from the total number (1000 sets) of the idle mobile stations in the paging area, and the total number (500 sets) of the active mobile stations (step S100). The ratio $\alpha$ is 2 (=1000/500) in the example of FIG. 11. The ratio $\alpha$ may be calculated in advance as an average value over a long period.

Next, the optimization processing unit 60 counts the number of handovers from the first cell to the second cell during the predetermined period T, and estimates the number of cell reselection (the number of cell reselection (first cell=>second cell) in FIG. 12) from the first cell to the second cell based on the number of handovers and the above-described ratio $\alpha$ (step S101). In other words, the number of cell reselection from the first cell to the second cell is estimated under an assumption that the ratio of the number of idle mobile stations to the number of active mobile stations in the paging area is equal to the ratio of the number of idle mobile stations to the number of active mobile stations in a cell in the paging area. In the example of FIG. 11, since the number of handovers (the number of HO) from the cell A to the cell B is 10, the number of cell reselection (A=>B) is estimated to be 20 (=10×2 (value of $\alpha$)).

Note that the number of cell reselection is an example of a third value.

Next, the optimization processing unit 60, for example, divides the number of the determining results of the non-aligned cell in the predetermined period, which the non-aligned cell specifying unit 50 has counted in the predetermined period T, i.e., the number of non-alignment (first cell=>second cell), by the number of cell reselection (first cell=>second cell). This calculates a cell non-alignment rate of the first cell (cell non-alignment rate (first cell=>second cell) in FIG. 12) (step S102). The cell non-alignment rate (first cell=>second cell) represents a ratio of occurrence of non-alignment in the first cell during the above-mentioned predetermined period T. For example, in FIG. 11, when the number of non-alignment (A=>B) is 15, the non-alignment rate (A=>B) is 0.75 (=15/20).

When it is determined that the non-alignment rate of the first cell calculated in the step S102 is larger than a predetermined threshold (YES in step S103), the optimization processing unit 60 performs following process. In other words, the optimization processing unit 60 specifies that the cell reselection criteria (CRS criteria) and the handover criteria (HO criteria) in the first cell are not aligned, i.e., specifies that the first cell is the non-aligned cell (step S104), and performs an optimization of the constituting parameters of both criteria in the first cell (step S105). In step S103, when it is determined that the non-alignment rate of the first cell calculated in the step S102 is equal to or less than the predetermined threshold, no processes are performed.

When the base station B of the cell B which is the handover destination depicted in FIG. 11 performs the flowchart of FIG. 12, the base station B performs the flowchart for both a case in which the first cell and the second cell are associated with the cell A and the cell B, respectively, and a case in which the first cell and the second cell are associated with the cell B and the cell A, respectively. Therefore, based on the number of non-alignment (A=>B) (count number; a first value), and the number of non-alignment (B=>A) (count number: a second value), it is determined whether both the non-alignment rate (A=>B) and the non-alignment rate (B=>A) are larger than the predetermined threshold in the step S103. In the step S104, the cell A is specified as the non-aligned cell when the non-alignment rate (A=>B)>threshold is satisfied, and the cell B is specified as the non-aligned cell when the non-alignment rate (B=>A)>threshold is satisfied. The optimization processing in the step S105 includes both of notification to the base station A when the cell A is specified as the non-aligned cell, and optimization process in the base station B when the cell B is specified as the non-aligned cell.

Note that, although the above describes a case in which the cell of handover destination is the cell B, as a matter of course, the same can be applies to a case in which the cell of handover destination is the cell A. In other words, the base station A of the cell A performs the process, which is similar to the process depicted in FIG. 12, based on the count value of the number of handovers to the cell A from the cell B in the predetermined period T in the same manner.

In adjacent cells A and cell B, the handover of the mobile station is mutually performed, and by sharing information on the count number of the non-alignment obtained in the base station of each cell, the base stations of the cell A and the cell B can perform the process in FIG. 12 in cooperation. By this method, the base station of one cell of the adjacent cells can count the nom-alignment based on the information from the base station of another cell of the adjacent cells.

For example, when the base station B of the cell B of the handover destination depicted in FIG. 11 performs the flowchart of FIG. 12, the base station B performs the flowchart for a case in which the first cell and the second cell are associated with the cell B and the cell A, respectively, and when the base station A of the cell A of the handover source depicted in FIG. 11 performs the flowchart of FIG. 12, the base station A performs the flowchart for a case in which the first cell and the second cell are associated with the cell A and the cell B, respectively. In this case, the base station B counts the non-alignment (B=>A), and when determination result of the non-aligned cell based on the cell selection history acquired from the mobile station is the non-alignment (A=>B) (i.e., the cell A is the non-aligned cell), the base station B notifies the base station A of the determination result which is the non-alignment (A=>B). The base station A counts the non-alignment (A=>B) based on the notification. Subsequent calculation of the non-alignment rate, comparison between the non-alignment rate and the threshold, and the optimization process in the base station B and the base station A are performed as is the case in above-mentioned processes.

In the flowchart of FIG. 12, the optimization process in the step S105 is performed as follows. For example, when the base station A of the cell A as the first cell performs the optimization of the local cell, the base station A first changes a cell reselection parameter or a handover parameter by a predetermined amount in a direction by which a movement of the mobile station from the cell A to the cell B is promoted, or in a direction by which the movement is suppressed. The base station A calculates the non-alignment rate (A=>B) after the above-described change of the parameter by the predetermined amount. When the non-alignment rate is decreased in comparison with the case before modification of the parameter, but is still over the threshold of the step S103, the parameters are further changed by the predetermined amount. When the non-alignment rate becomes equal to or less than the threshold by such gradational modification of parameter, the base station A stops the modification of the parameter, and advertises the cell reselection parameter after modification, or transmits the handover parameter after modification to the mobile station.

As illustrated above, in the mobile communication system of the present embodiment, the base station finally specifies the non-aligned cell based on the number of cell reselection of a plurality of mobile stations between the cells in a predetermined period and the number of times of determining the non-aligned cell in the period. Therefore, in the mobile communication system, the non-aligned cell can be specified with sufficient accuracy.

(3) Third Embodiment

Next, a third embodiment will be described.

(3-1) Mobile Communication System

In the mobile communication system of the first and second embodiments, the base station acquires the selection history of the cell by the mobile station in the idle state, and the base station specifies the cell in which the reselection criteria and the handover criteria are not aligned based on the selection history. However, the mobile station itself may specify the cell in which the reselection criteria and the handover criteria are not aligned based on the selection history of the cell, and notify the base station of the specified cell.

(3-2) Constitution of Base Station and Mobile Station

Figure 13:
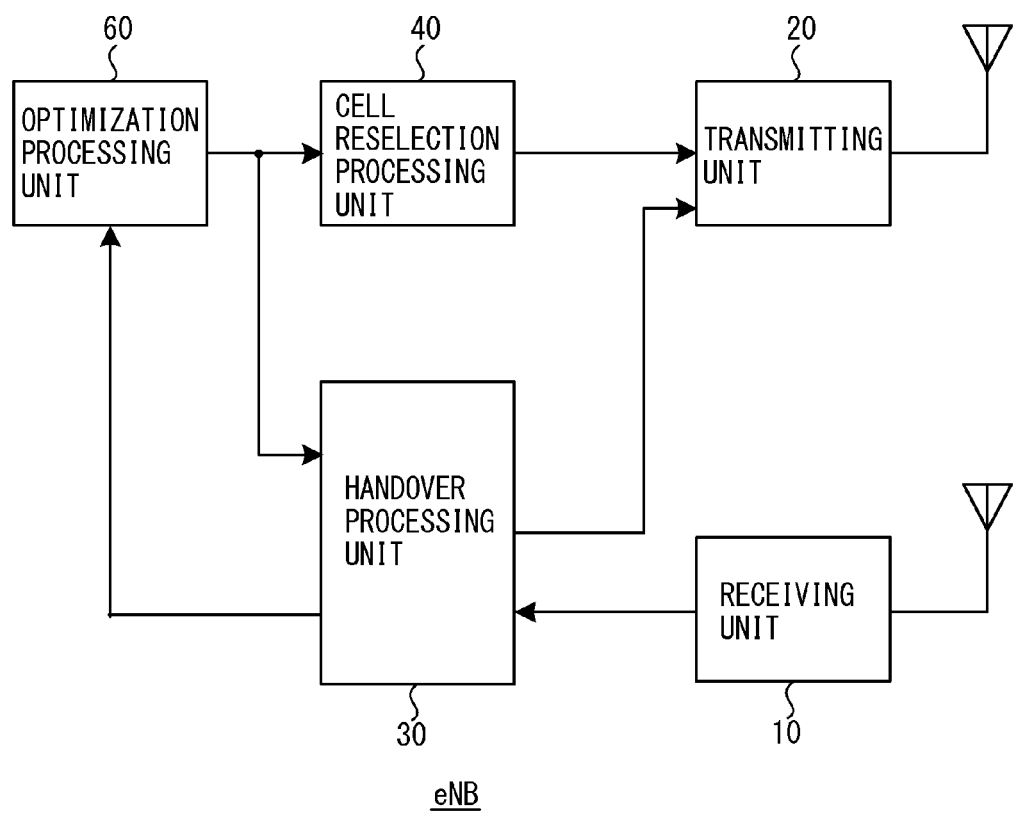
FIG. 13 is a block diagram depicting a schematic structure of a base station in a third embodiment.
Figure 14:
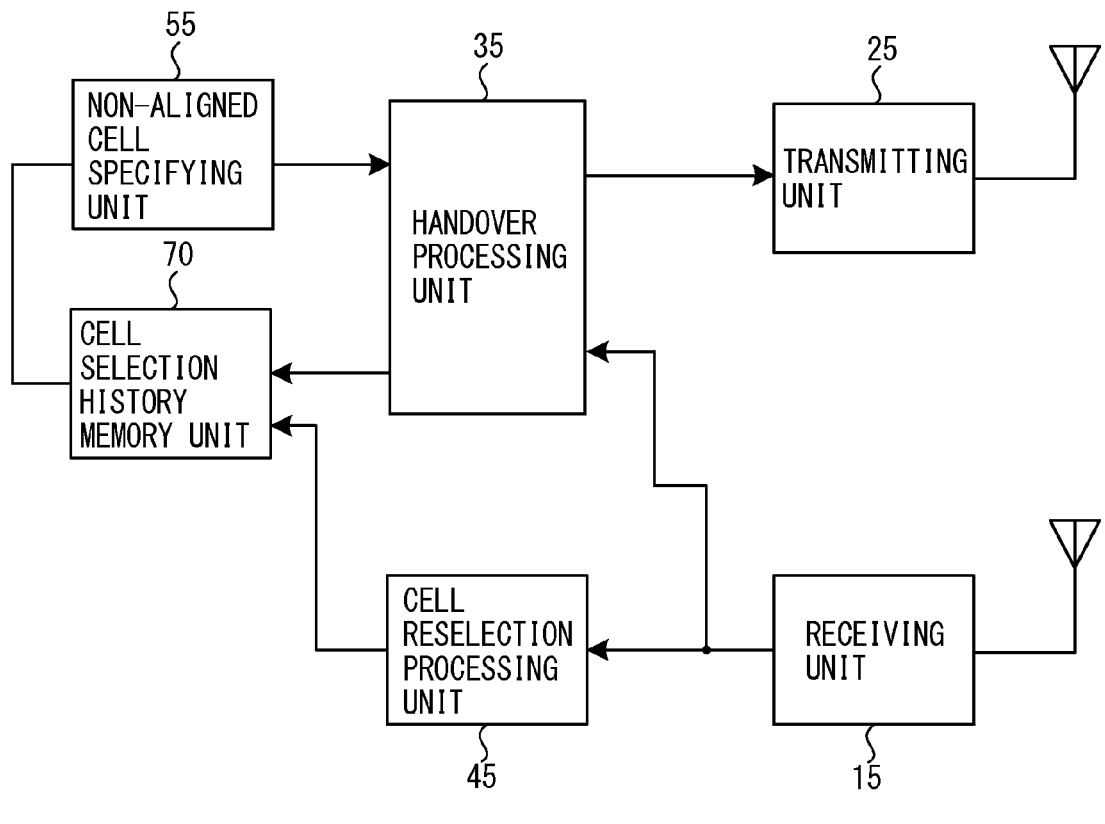
FIG. 14 is a block diagram depicting a schematic structure of a mobile station in the third embodiment.

The constitutions of the base station and the mobile station according to the present embodiment will be illustrated with reference to FIG. 13 and FIG. 14. FIG. 13 is a block diagram depicting a schematic structure of the base station eNB. FIG. 14 is a block diagram depicting a schematic structure of the mobile station UE.

The constitution of the base station depicted in FIG. 13 is different from the constitution depicted in FIG. 4 in that the constitution in FIG. 13 does not include the non-aligned cell specifying unit 50. In the present embodiment, since a handover message which the base station has received from the mobile station includes the specifying result of the non-aligned cell, the handover processing unit 30 extracts the specifying result, and notifies the optimization processing unit 60 of the specifying result. On the other hand, the constitution of the mobile station depicted in FIG. 14 is different from the constitution depicted in FIG. 5 in that a non-aligned cell specifying unit 55 is added in constitution in FIG. 14. In the mobile station of the present embodiment, the non-aligned cell specifying unit 55 specifies the non-aligned cell in a manner similar to the method described in the first or second embodiment, and notifies the handover processing unit 35. The handover processing unit 35 generates the handover message including the information on the non-aligned cell, and transmits the message to the base station through the transmitting unit 25.

(3-3) Operation of Mobile Communication System

Next, operation of the mobile communication system including the mobile station and the base stations A and B which are adjacent to each other will be illustrated with reference to FIG. 15 and FIG. 16. FIG. 15 is a flowchart depicting operation of the mobile communication system when the cell A of the base station A is the non-aligned cell. FIG. 16 is a flowchart depicting operation of the mobile communication system when the cell B of the base station B is the non-aligned cell.

(3-3-1) When Cell A is Non-Aligned Cell

In FIG. 15, since the steps S1 to S7 are the same as the steps in FIG. 6, redundant illustration is avoided.

In the step S20 following the step S7, the mobile station specifies the non-aligned cell. Here, the method illustrated in the first or second embodiment may be applied as a method for specifying the non-aligned cell. In this case, in the mobile station, the selection results of the cell when the mobile station itself is in the idle state and in the active state are stored in the cell selection history memory unit 70 in order of the time series as the cell selection history. The non-aligned cell specifying unit 55 of the mobile station specifies which cell is the non-aligned cells from among the cell A and the cell B, with reference to the cell selection history.

A process that the handover processing unit 35 of the mobile station generates a handover confirm message (HO Confirm Message), and transmits the message to the base station B of the cell B designated by the handover command message, is similar to the step in the first embodiment (step S8 of FIG. 6). The present embodiment is different from the first embodiment in that, in the step S11, the handover confirm message includes information on the non-aligned cell specified in the step S20.

In the flowchart of FIG. 15, it is assumed that the cell A is the non-aligned cell. A process that the base station B which has received the handover confirm message transmits a context release message including the notification of the cell A being the non-aligned cell to the base station A, is the same as the step in the first embodiment.

(3-3-2) When Cell B is Non-Aligned Cell

In FIG. 16, since the steps S1 to S11 are the same as the steps in FIG. 15, redundant illustration is avoided.

In the flowchart of FIG. 16, it is assumed that the cell B is the non-aligned cell. In this case, although the context release message of the mobile station is transmitted from the base station B to the base station A (step S12), a matter that the message may not include the notification of the cell B being the non-aligned cell is the same as the first embodiment.

As mentioned above, in the mobile communication system of the present embodiment, since the mobile station has stored the selection history of the cell including the history in the idle state, the mobile station itself can specify the non-aligned cell.

Moreover, the mobile station does not feed back the non-aligned cell to the base station in all cases, but it is preferable that the mobile station feeds back the non-aligned cell, only when a handover is performed right after the mobile station establishes a connection with the base station and changes into the active state. Accordingly, the traffic of a message transmission and reception due to the feedback of the non-aligned cell can be suppressed.

(4) Fourth Embodiment

Hereinafter, a fourth embodiment will be described.

In the mobile communication system of the present embodiment, a method for specifying the non-aligned cell is different from the methods in the above-mentioned embodiments. Specifically, in the flowchart depicted in FIG. 12, the process (step S100 to S101) before calculating the non-alignment rate is different from the above-mentioned embodiments. In other words, the present embodiment is different from above-mentioned embodiments in that, when the base station calculates the non-alignment rate (first cell=>second cell), the base station does not estimate the number of cell reselection (first cell=>second cell), but the base station itself counts the number of cell reselection.

Note that the constitutions of the base station and the mobile station in the present embodiment may be the same as the constitutions depicted in FIG. 4 and FIG. 5, respectively. In the following illustration, the components depicted in FIG. 4 or FIG. 5 are referred to arbitrarily.

Next, operation of the mobile communication system including the mobile station and the base stations A and B which are adjacent to each other according to the present embodiment will be illustrated with reference to FIG. 17. FIG. 17 is a flowchart depicting operation of the mobile communication system according to the present embodiment.

In the steps S1 to S10 of FIG. 17, it is assumed that the cell A is the non-aligned cell, and the steps are the same as the steps in FIG. 6. Therefore, redundant illustration is avoided. The present embodiment is the same as the above-mentioned embodiments in that the non-aligned cell is specified as illustrated in the above-mentioned embodiments, and notified to the base station which forms the non-aligned cell. The present embodiment is different from the above-mentioned embodiments in that, when the number (number of the non-aligned cells) of determination in which it is determined that a specific cell is not aligned within a predetermined period exceeds a threshold, for example, based on the cell selection history acquired from the mobile station one by one, the cell selection history is made to report from the mobile station. In FIG. 17, an example is depicted by the process of the mobile station 1, in which the count number of the non-aligned cell within the predetermined period exceeds the threshold, and after that, mobile station (in FIG. 17, mobile station 2) is made to report the cell selection history therefrom, for example.

Referring to FIG. 17, the mobile station 2 is the idle state at the time of step S21, and has selected the cell A. The cell reselection processing unit 45 of the mobile station monitors the predetermined reference signal advertised from the base station A through the receiving unit 15, and receives the reference signal intermittently, and receives the signal of the cell reselection parameter advertised from the base station A (step S22). At this time, since the connection with the mobile station has not been established with not only the base station A but also the base station B, it is impossible for the base station to recognize from which cell the mobile station monitors the signal.

Next, the base station A advertises the cell selection history report command message which instructs to report the cell selection history, addressing to the mobile stations including the mobile station 2 which are under a control of the base station A (step S23).

In the flowchart of FIG. 17, it is assumed that the cell B is reselected in accordance with the cell reselection criteria constituted by the cell reselection parameter advertised by the base station A. As a result, the signal from the base station B is intermittently monitored (step S24), and the signal of the cell reselection parameter advertised from the base station B is received (step S25). After that, the mobile station 2 changes into the active state, and establishes a connection with the base station B (step S26). At this time, the mobile station 2 is made to add the cell selection history according to the cell selection history report command message in the step S23 into the message which is transmitted when establishing the connection with the base station B, thereby reporting the cell selection history to the base station B (step S26). The base station B notifies the base station A of the cell selection history reported from the mobile station 2 through a line between the base stations (step S27).

By performing the above-mentioned process, the base station causes the mobile station under a control of the base station to report the cell selection history, for example triggered by a fact that the number (number of the non-aligned cells) of determination in which it is determined that a specific cell is not aligned within a predetermined period exceeds a threshold. Thereby the cell selection history is shared by a plurality of base stations.

Next, with reference to FIG. 18, the process which is performed by the base station of the present embodiment and includes the method of specifying the non-aligned cell will be illustrated. FIG. 18 is a flowchart depicting process in the base station in the present embodiment. The flowchart depicted in FIG. 18 includes the process after acquiring the cell selection history before optimizing the parameter. This process is performed mainly by the optimization processing unit 60 in the base station.

In FIG. 18, the optimization processing unit 60 determines, for every predetermined period T, whether the number of the determining results of the non-aligned cell in a predetermined period, for example, which is counted by the non-aligned cell specifying unit 50 during the predetermined period T, i.e., the number of non-alignment (first cell=>second cell) exceeds the threshold (step S100a). When the number of non-alignment (first cell=>second cell) exceeds the threshold, the base station transmits the cell selection history report command message which instructs to report the cell selection history to the mobile stations under a control of the base station (step S100b). The optimization processing unit 60 counts the number of cell reselection from the first cell to the second cell, i.e., the number of cell reselection (first cell=>second cell), based on the cell selection history reported from the mobile stations in response to the step S100b in the predetermined period T (step S100c).

Since the process (steps S102 to S105) after calculating the number of cell reselection (first cell=>second cell) is the same as the process depicted in FIG. 12, redundant illustration is avoided.

Although a calculation of the number of cell reselection (first cell=>second cell) depicted in FIG. 12 estimates a value based on the total number of the idle mobile stations in a paging area and the total number of active mobile stations, the present embodiment obtains an actual measured value of the number of cell reselection. Therefore, the present embodiment has an advantage that a calculation precision of the number of cell reselection is higher than the method depicted in FIG. 12, and a determination precision (determination precision in the step S103) of the non-alignment rate (first cell=>second cell) is also high.

Moreover, according to the flowchart depicted in FIG. 18, the cell selection history is reported from the mobile station to the base station only when the number of non-alignment (first cell=>second cell) exceeds the threshold, and therefore the traffic of the message transmission and reception due to the feedback of the cell selection history can be suppressed.

According to a disclosed cell specifying method, a base station, and a mobile station, it is possible to specify a cell in which criterion for cell reselection and criterion for a handover of a mobile station are not aligned.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A cell specifying method in a cellular mobile communication system which includes a mobile station and base stations forming cells, and which operates in a first state in which the mobile station has not established a connection with a base station and in a second state in which the connection has been established with any of the base stations, the method comprising:

storing, by the mobile station, cell selection history including one or more selection histories of the cells performed in accordance with first criteria for cell reselection in the first state and a serving time of the mobile station in the cell in the first state in time order;

transmitting, by the mobile station, the cell selection history to a base station of a second cell when performing a handover from a first cell to the second cell in accordance with second criteria for handover in the second state;

referring, by the base station of the second cell, to the transmitted cell selection history, and specifying a cell in which the first criteria and the second criteria are not aligned from among the first cell and the second cell based on the cell selection history, when it is determined that the mobile station has performed the handover from the first cell to the second cell in a predetermined period after a transition from the first state to the second state; and specifying, by the base station of the second cell, which one of the first cell and the second cell is said non-aligned cell, where the base station of the second cell specifies that said non-aligned cell is the first cell but not the second cell when determined that a first selection history just before the handover indicates that the serving time in the first cell in the first state is equal to or larger than a threshold value, based on the cell selection history, and where the base station of the second cell specifies that the non-aligned cell is the second cell but not the first cell when determined that the first selection history indicates that the serving time in the first cell in the first state is smaller than the threshold value and further a second selection history just before said first selection history indicates that the serving time in the second cell in the first state is equal to or larger than the threshold value, based on the cell selection history.

2. A cell specifying method in a cellular mobile communication system which includes a mobile station and base stations forming cells, and which operates in a first state in which the mobile station has not established a connection with a base station and in a second state in which the connection has been established with any of the base stations, the method comprising:

storing, by the mobile station, cell selection history including one or more selection histories of the cells performed in accordance with first criteria for cell reselection in the first state and a serving time of the mobile station in the cell in the first state in time order;

referring, by the mobile station, to the cell selection history when performing a handover from a first cell to a second cell in accordance with second criteria for handover in the second state, and specifying a cell in which the first criteria and the second criteria are not aligned from among the first cell and the second cell based on the cell selection history, when it is determined that the mobile station has performed the handover from the first cell to the second cell in a predetermined period after a transition from the first state to the second state;

specifying, by the mobile station, which one of the first cell and the second cell is said not-aligned cell, where the mobile station specifies that said non-aligned cell is the first cell but not the second cell when determined that a first selection history just before the handover indicates that the serving time in the first cell in the first state is equal to or larger than a threshold value, based on the cell selection history, and where, the mobile station specifies that the non-aligned cell is the second cell but not the first cell when determined that the first selection history indicates that the serving time in the first cell in the first state is smaller than the threshold value and further a second selection history just before said first selection history indicates that the serving time in the second cell in the first state is equal to or larger than the threshold value, based on the cell selection history; and notifying the base station of the second cell of the specified cell.

3. The cell specifying method according to claim 1, further comprising: by the base station, calculating a first value which is the number of times of specifying the first cell as the cell in which the first criteria and the second criteria are not aligned from among the first cell and the second cell in a predetermined period, or a second value which is the number of times of specifying the second cell;

calculating a third value being the number of the mobile stations which are in the first state and are moved to the second cell from the first cell in the predetermined period, or being the number of the mobile stations which are in the first state and are moved to the first cell from the second cell; and specifying the cell in which the first criteria and the second criteria are not aligned in the predetermined period from among the first cell and the second cell based on a ratio of the first value or the second value to the third value.

4. The cell specifying method according to claim 3, wherein the base station calculates the third value based on a ratio of the total number of the mobile stations in the first state to the total number of the mobile stations in the second state in a paging area including the base station itself, and the number of the mobile stations which have performed the handover from the first cell to the second cell in the predetermined period, or the number of the mobile stations which have performed the handover from the second cell to the first cell.

5. The cell specifying method according to claim 3, wherein the base station: by the base station instructing the mobile station which is under a control of the base station itself to transmit the cell selection history to the base station itself, when the first value or the second value exceeds a predetermined threshold; and calculating the third value based on the cell selection history received from the mobile station in the predetermined period.

6. A base station in a cellular mobile communication system which operates in a first state in which the mobile station has not established a connection with a base station, the base station being comprised of a processor, and in a second state in which the connection has been established with any of the base stations, the base station comprising:

a receiving unit, formed by the processor, which receives, from the mobile station, cell selection history including one or more selection histories of the cells performed by the mobile station in accordance with first criteria for cell reselection in the first state and a serving time of the mobile station in the cell in the first state in time order, when the mobile station performs a handover from a first cell to the second cell in accordance with second criteria for handover in the second state; and a non-aligned cell specifying unit, formed by the processor, which refers to the cell selection history received by the receiving unit, and specifies which one of the first cell and the second cell is said non-aligned cell, where the base station of the second cell specifies that said non-aligned cell is the first cell but not the second cell when determined that a first selection history just before the handover indicates that the serving time in the first cell in the first state is equal to or larger than a threshold value, based on the cell selection history, and where, the base station of the second cell specifies that the non-aligned cell is the second cell but not the first cell when determined that the first selection history indicates that the serving time in the first cell in the first state is smaller than the threshold value and further a second selection history just before said first selection history indicates that the serving time in the second cell in the first state is equal to or larger than the threshold value, based on the cell selection history.

7. The base station according to claim 6, wherein the non-aligned cell specifying unit:

calculates a first value which is the number of times of specifying the first cell as the cell in which the first criteria and the second criteria are not aligned from among the first cell and the second cell in a predetermined period, or a second value which is the number of times of specifying the second cell;

calculates a third value being the number of the mobile stations which are in the first state and are moved to the second cell from the first cell in the predetermined period, or being the number of the mobile stations which are in the first state and are moved to the first cell from the second cell; and specifies the cell in which the first criteria and the second criteria are not aligned in the predetermined period from among the first cell and the second cell based on a ratio of the first value or the second value to the third value.

8. The base station according to claim 7, wherein the non-aligned cell specifying unit:

calculates the third value based on a ratio of the total number of the mobile stations in the first state to the total number of the mobile stations in the second state in a paging area including the base station itself, and the number of the mobile stations which have performed the handover from the first cell to the second cell in the predetermined period, or the number of the mobile stations which have performed the handover from the second cell to the first cell.

9. The base station according to claim 7, wherein the non-aligned cell specifying unit:

instructs the mobile station which is under a control of the base station itself to transmit the cell selection history to the base station itself, when the first value or the second value exceeds a predetermined threshold; and calculates the third value based on the cell selection history received from the mobile station in the predetermined period.

10. A mobile station in a cellular mobile communication system, the mobile station being comprised of a processor and a memory cooperating with the processor, which operates in a first state in which the mobile station has not established a connection with a base station and in a second state in which the connection has been established with any of the base stations, the mobile station comprising:

the memory cooperating with the processor which stores cell selection history including one or more selection histories of the cells performed in accordance with first criteria for cell reselection in the first state and a serving time of the mobile station in the cell in the first state in time order;
a non-aligned cell specifying unit, formed by the processor, which refers to, when performing a handover from a first cell to the second cell in accordance with second criteria for handover in the second state, the cell selection history, and specifying which one of the first cell and the second cell is said not-aligned cell, where the non-aligned cell specifying unit specifies that said non-aligned cell is the first cell but not the second cell when determined that a first selection history just before the handover indicates that the serving time in the first cell in the first state is equal to or larger than a threshold value, based on the cell selection history, and where, the non-aligned cell specifying unit specifies that the non-aligned cell is the second cell but not the first cell when determined that the first selection history indicates that the serving time in the first cell in the first state is smaller than the threshold value and further a second selection history just before said first selection history indicates that the serving time in the second cell in the first state is equal to or larger than the threshold value, based on the cell selection history; and
a transmitting unit, a part of which being formed by the processor, which notifies the base station of the second cell of the specified cell.

* * * * *